(12) United States Patent
Kaneko

(10) Patent No.: US 11,500,622 B2
(45) Date of Patent: Nov. 15, 2022

(54) INFORMATION PROCESSING APPARATUS, INFORMATION PROCESSING SYSTEM, AND NON-TRANSITORY COMPUTER READABLE MEDIUM FOR COORDINATING A SWITCH TO AN UPDATED PROGRAM IN A CLUSTER TO SUPPRESS CONFUSION ON USERS

(71) Applicant: FUJIFILM BUSINESS INNOVATION CORP., Tokyo (JP)

(72) Inventor: Kazuhiro Kaneko, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/988,871

(22) Filed: Aug. 10, 2020

(65) Prior Publication Data

US 2021/0294589 A1     Sep. 23, 2021

(30) Foreign Application Priority Data

Mar. 18, 2020  (JP) ............................ JP2020-048309

(51) Int. Cl.
  *G06F 8/65*   (2018.01)
  *G06F 9/54*   (2006.01)

(52) U.S. Cl.
  CPC ............... *G06F 8/65* (2013.01); *G06F 9/542* (2013.01)

(58) Field of Classification Search
  CPC . G06F 8/65; G06F 9/542; H04L 67/10; H04L 67/34
  See application file for complete search history.

(56) References Cited

U.S. PATENT DOCUMENTS

| | | | |
|---|---|---|---|
| 7,958,210 B2 | 6/2011 | Sakurai et al. | |
| 10,620,937 B1* | 4/2020 | Brass | G06F 8/38 |
| 2005/0210459 A1* | 9/2005 | Henderson | G06F 8/65 |
| | | | 717/168 |
| 2005/0262495 A1* | 11/2005 | Fung | G06F 8/65 |
| | | | 717/170 |
| 2009/0240791 A1* | 9/2009 | Sakurai | G06F 8/65 |
| | | | 709/221 |
| 2011/0145807 A1* | 6/2011 | Molinie | G06F 8/65 |
| | | | 717/170 |

(Continued)

FOREIGN PATENT DOCUMENTS

| | | |
|---|---|---|
| JP | 2009-230171 A | 10/2009 |
| JP | 2017-004502 A | 1/2017 |
| JP | 2018-156555 A | 10/2018 |

*Primary Examiner* — Daxin Wu
(74) *Attorney, Agent, or Firm* — Oliff PLC

(57) ABSTRACT

An information processing apparatus includes a processor that executes a first program. The processor is configured to acquire update information for executing update from the first program to a second program, execute the update by using the update information, accept a request for a function of the first program in a case where at least one of plural information processing apparatuses constituting a cluster has not completed the update, the plural information processing apparatuses being the information processing apparatus and one or more other information processing apparatuses, and provide a function of the second program to a user in a case where all the plural information processing apparatuses have completed the update.

20 Claims, 22 Drawing Sheets

(56) References Cited

U.S. PATENT DOCUMENTS

| | | | |
|---|---|---|---|
| 2014/0207844 A1* | 7/2014 | Mayo | G06F 8/65 |
| | | | 709/203 |
| 2017/0060570 A1* | 3/2017 | Miller | G06F 8/71 |
| 2018/0157477 A1* | 6/2018 | Johnson | G06F 9/451 |
| 2019/0265965 A1* | 8/2019 | Acharya | G06F 8/658 |
| 2019/0317750 A1* | 10/2019 | Ramsay | G06F 9/45558 |
| 2020/0019400 A1* | 1/2020 | Zhao | G06F 8/71 |
| 2021/0048997 A1* | 2/2021 | Samuel | G06F 8/71 |

* cited by examiner

FIG. 11A

| APPARATUS ID | DATE AND TIME OF UPDATE COMPLETION |
|---|---|
| Q24 | ... |
| Q27 | ... |
| Q29 | ... |

FIG. 11B

| APPARATUS ID | DATE AND TIME OF UPDATE COMPLETION |
|---|---|
| Q24 | ... |
| Q27 | ... |
| Q29 | ... |
| Q22 | ... |

INFORMATION PROCESSING APPARATUS, INFORMATION PROCESSING SYSTEM, AND NON-TRANSITORY COMPUTER READABLE MEDIUM FOR COORDINATING A SWITCH TO AN UPDATED PROGRAM IN A CLUSTER TO SUPPRESS CONFUSION ON USERS

CROSS-REFERENCE TO RELATED APPLICATIONS

This application is based on and claims priority under 35 USC 119 from Japanese Patent Application No. 2020-048309 filed Mar. 18, 2020.

BACKGROUND

(i) Technical Field

The present disclosure relates to an information processing apparatus, an information processing system, and a non-transitory computer readable medium.

(ii) Related Art

To increase the availability of an information processing system, a so-called cluster system (hereinafter also simply referred to as a "cluster") formed by clustering plural server apparatuses has been used.

For example, Japanese Unexamined Patent Application Publication No. 2009-230171 discloses an update management program that causes a computer to manage the update timing of a program loaded in plural management target nodes constituting a cluster system. In this update management program, in response to an update instruction of the program, the plurality of management target nodes are registered while being grouped into plural groups, an update management table defining an update order for each group is referred to, the first group in the update order is selected first, the individual groups are sequentially selected in accordance with the update order every time an update process for all the management target nodes belonging to the previously selected group is completed, the update management table is referred to, an update request of the program is transmitted to the management target nodes belonging to the selected group, an update completion notification is accepted from each management target node to which the update request has been transmitted, and a notification is made indicating that the update process has been completed in the management target node that has transmitted the update completion notification.

Japanese Unexamined Patent Application Publication No. 2017-4502 discloses an information system including a monitoring target system that includes a cluster including plural hosts, and a monitoring server apparatus that monitors the state of the monitoring target system. The monitoring server apparatus determines whether or not the monitoring target system is normally operating and transmits first state information indicating a determination result. A host receives the first state information from the monitoring server apparatus, receives, from other hosts in the same cluster, second state information indicating the operation states of the other hosts, acquires update information from the outside in response to an instruction to start an update operation, executes an update operation on the basis of the update information, and, if first state information received after completing the update operation is normal, transmits an update start instruction to one of the other hosts capable of executing the update operation according to the received second state information.

Japanese Unexamined Patent Application Publication No. 2018-156555 discloses a cluster system including an update management apparatus that performs update of software in servers having an N-Active configuration, and an update assignment apparatus that assigns a processing request to one of the servers. The update management apparatus updates the software used in a server in response to an instruction to update the software and in response to the end of a service provided by the target server of update of the software. The update assignment apparatus determines which of a new server that has updated the software and an old server that has not updated the software is to process a processing request to a server that is updating the software on the basis of the processing request, and assigns the processing request to either of the servers.

SUMMARY

When functions provided by individual server apparatuses in a cluster vary, a user may be confused.

Aspects of non-limiting embodiments of the present disclosure relate to, in update of a program in a cluster constituted by plural information processing apparatuses, when an updated function is requested from a user of the cluster before all the information processing apparatuses constituting the cluster complete the update of the program, suppressing the occurrence of confusion caused by a state in which the requested function is not provided.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor that executes a first program. The processor is configured to acquire update information for executing update from the first program to a second program, execute the update by using the update information, accept a request for a function of the first program in a case where at least one of plural information processing apparatuses constituting a cluster has not completed the update, the plural information processing apparatuses being the information processing apparatus and one or more other information processing apparatuses, and provide a function of the second program to a user in a case where all the plural information processing apparatuses have completed the update.

BRIEF DESCRIPTION OF THE DRAWINGS

Exemplary embodiments of the present disclosure will be described in detail based on the following figures, wherein:

FIGS. 11A and 11B are diagrams each illustrating an example of a second notification according to the first exemplary embodiment;

DETAILED DESCRIPTION

First Exemplary Embodiment

Configuration of Information Processing System

Figure 1:
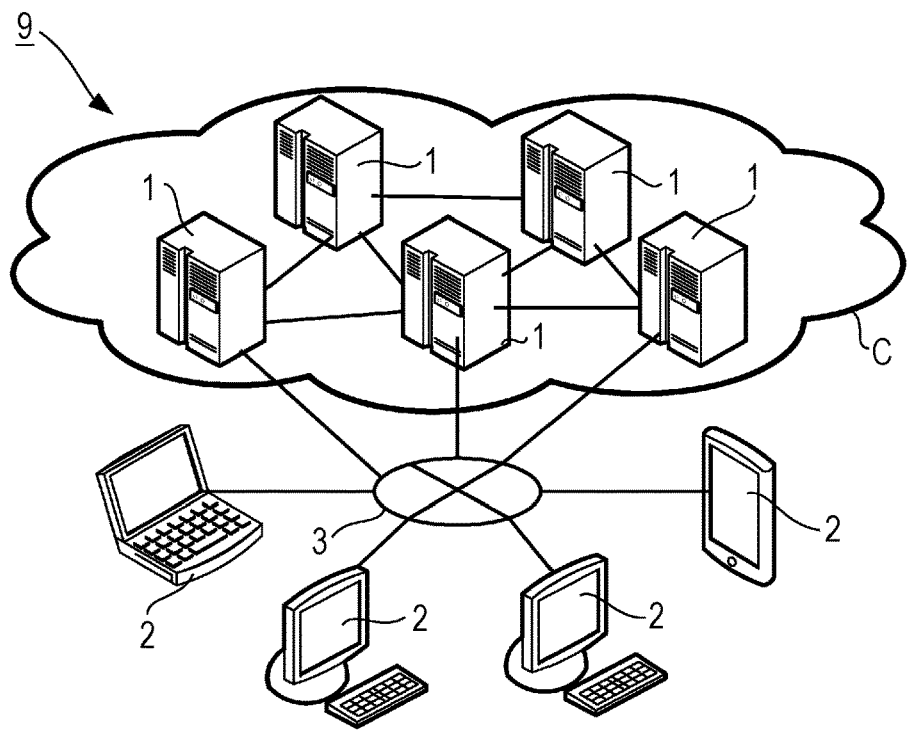
FIG. 1 is a diagram illustrating an example of an overall configuration of an information processing system according to a first exemplary embodiment.

FIG. 1 is a diagram illustrating an example of an overall configuration of an information processing system 9. The information processing system 9 illustrated in FIG. 1 is a system formed by clustering plural server apparatuses each of which executes a computer program (hereinafter simply referred to as a program) and provides a service. The information processing system 9 includes plural information processing apparatuses 1, terminals 2, and a communication line 3, as illustrated in FIG. 1.

Each of the terminals 2 is a terminal apparatus used by a user of the information processing system 9 and is, for example, a desktop, notebook, or tablet personal computer. The terminal 2 receives a user operation and provides an instruction to one of the information processing apparatuses 1 in accordance with the operation.

Each of the information processing apparatuses 1 is, for example, a computer, and is a server apparatus that responds to a request from the terminal 2 serving as a client apparatus. The plural information processing apparatuses 1 included in the information processing system 9 dynamically share a request from the terminal 2, thereby constituting a cluster C. Thus, the information processing system 9 is an example of an information processing system including a terminal and plural information processing apparatuses constituting a cluster.

One of the plural information processing apparatuses 1 may also function as a so-called load balancer that monitors the processing loads of the other information processing apparatuses 1 and allocates processing.

The communication line 3 is a line that connects the information processing apparatuses 1 and the terminals 2 such that both are capable of communicating with each other. The communication line 3 may be, for example, a local area network (LAN), a wide area network (WAN), the Internet, or any selective combination thereof. The communication line 3 may include public switched telephone networks (PSTN), integrated services digital network (ISDN), or the like. The communication line 3 is connected to an external apparatus that is not illustrated, and at least one of the information processing apparatuses 1 acquires information from the external apparatus.

In the information processing system 9, the number of information processing apparatuses 1, the number of terminals 2, and the number of communication lines 3 are not limited to those illustrated in FIG. 1. It is sufficient that there be plural information processing apparatuses 1.

Configuration of Information Processing Apparatus

Figure 2:
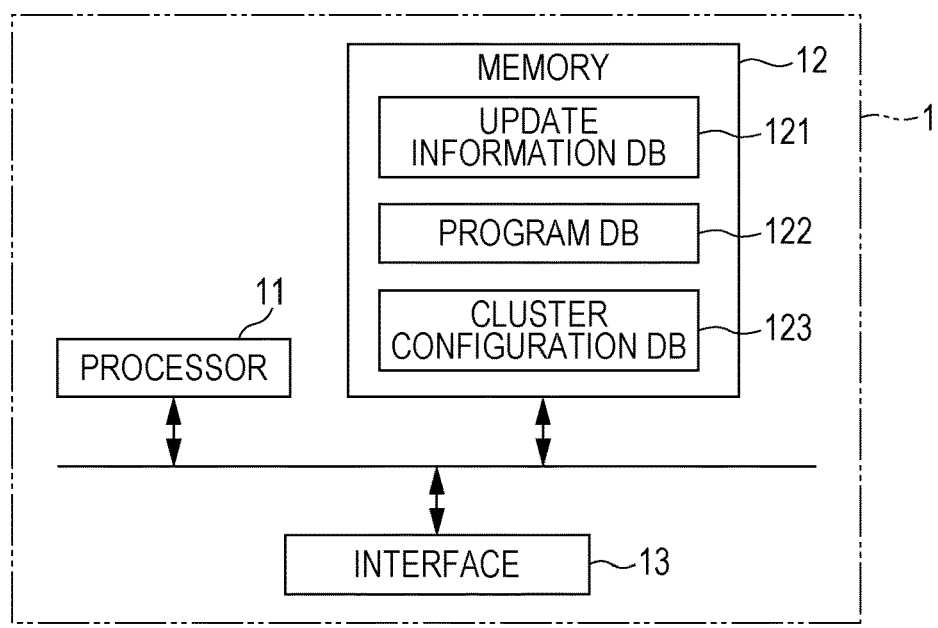
FIG. 2 is a diagram illustrating an example of the configuration of an information processing apparatus according to the first exemplary embodiment.

FIG. 2 is a diagram illustrating an example of the configuration of the information processing apparatus 1. The information processing apparatus 1 illustrated in FIG. 2 includes a processor 11, a memory 12, and an interface 13. These components are connected, for example, through a bus so as to be capable of communicating with each other.

The processor 11 reads out and executes a program stored in the memory 12 to control the individual components of the information processing apparatus 1. The processor 11 is, for example, a central processing unit (CPU).

The interface 13 is a communication circuit that connects the information processing apparatus 1 to the terminal 2 through the communication line 3 in a wired or wireless manner such that both are capable of communicating with each other.

The memory 12 is a storage unit that stores an operating system, various programs, data, and the like that are to be read by the processor 11. The memory 12 includes a random access memory (RAM) and a read only memory (ROM). The memory 12 may include a solid state drive, a hard disk drive, or the like.

The memory 12 also stores an update information database (DB) 121 and a program DB 122. Furthermore, the memory 12 illustrated in FIG. 2 stores a cluster configuration DB 123.

Figure 3:
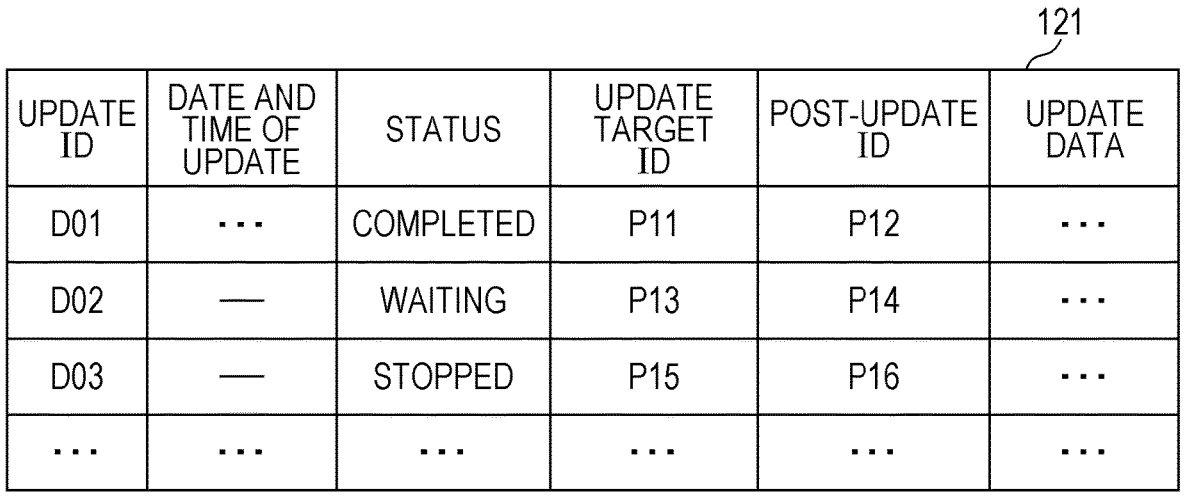
FIG. 3 is a diagram illustrating an example of an update information DB according to the first exemplary embodiment.

FIG. 3 is a diagram illustrating an example of the update information DB 121. The update information DB 121 illustrated in FIG. 3 is a database that stores information for updating a program executed in the information processing apparatus 1 (update information).

In the update information DB 121 illustrated in FIG. 3, an update ID is identification information for identifying update information. A date and time of update is information indicating the data and time when a program is updated using update information. A status indicates the status of update of a program using update information and is, for example, "completed" "waiting", "stopped", or the like. An update target ID is identification information for identifying a program to be updated using update information. A post-update ID is identification information for identifying a program generated by updating a target program by using update information. Update data is data indicating the details of update.

The update information DB 121 illustrated in FIG. 3 handles plural pieces of update information. Alternatively, the update information DB 121 may be configured to handle only one piece of update information. In this case, the update information DB 121 may not have a field of update ID.

Figure 4:
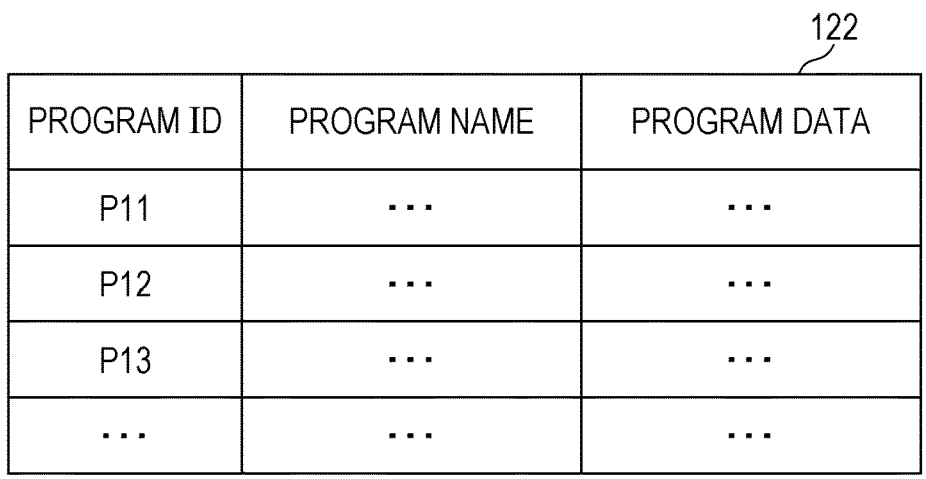
FIG. 4 is a diagram illustrating an example of a program DB according to the first exemplary embodiment.

FIG. 4 is a diagram illustrating an example of the program DB 122. The program DB 122 is a database that stores a program executed by the processor 11. For example, the program DB 122 is a folder or the like storing an executable file in a file system.

In the program DB 122 illustrated in FIG. 4, a program ID is identification information for identifying a program. A program name is information made of a character string or the like indicating the name of a program. Program data is data indicating the content of a program.

Figure 5:
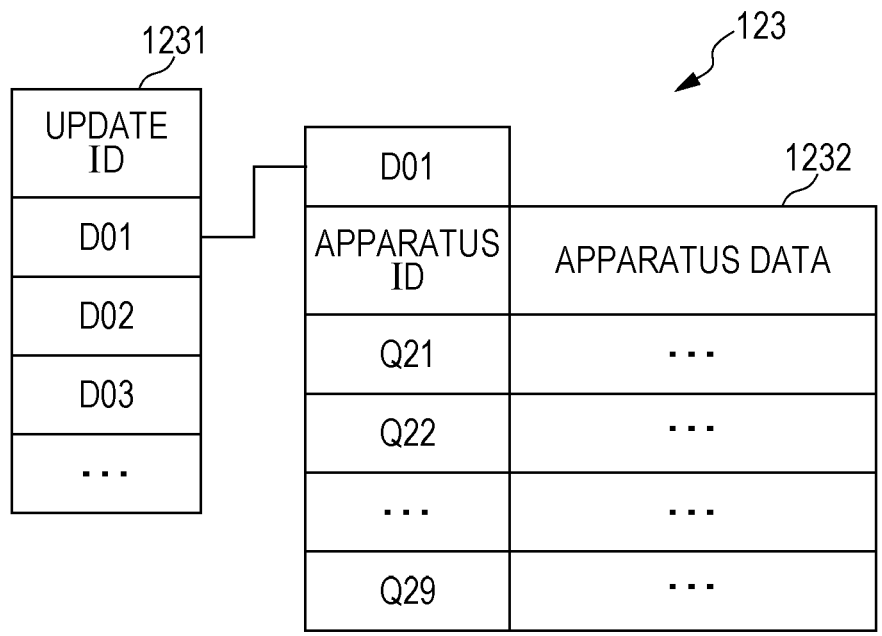
FIG. 5 is a diagram illustrating an example of a cluster configuration DB according to the first exemplary embodiment.

FIG. 5 is a diagram illustrating an example of the cluster configuration DB 123. The cluster configuration DB 123 is a database that stores information indicating the configuration of the cluster C to which the information processing apparatuses 1 belong. The cluster configuration DB 123 illustrated in FIG. 5 has an update ID list 1231 and an apparatus list 1232.

The update ID list 1231 is a list of update IDs stored in the update information DB 121. The apparatus list 1232 is a list of apparatuses associated with each of the update IDs stored in the update ID list 1231 and has fields of apparatus ID and apparatus data. The apparatus ID in the apparatus list 1232 is identification information for identifying the information processing apparatus 1 that is caused to update a program by using the update information indicated by the update ID associated with the apparatus list 1232. The apparatus data in the apparatus list 1232 is data indicating various types of information, including identification information used for communication such as an Internet protocol (IP) address of the information processing apparatus 1 identified by the apparatus ID, and environment information used in update.

In the apparatus list 1232 corresponding to the update ID "D01" in the update ID list 1231 illustrated in FIG. 5, nine apparatus IDs "Q21" to "Q29" are stored. This means that, in the cluster C, a first program that is updated using the update information identified by the update ID "D01" is executed in the information processing apparatuses 1 respectively identified by the nine apparatus IDs.

Configuration of Terminal

Figure 6:
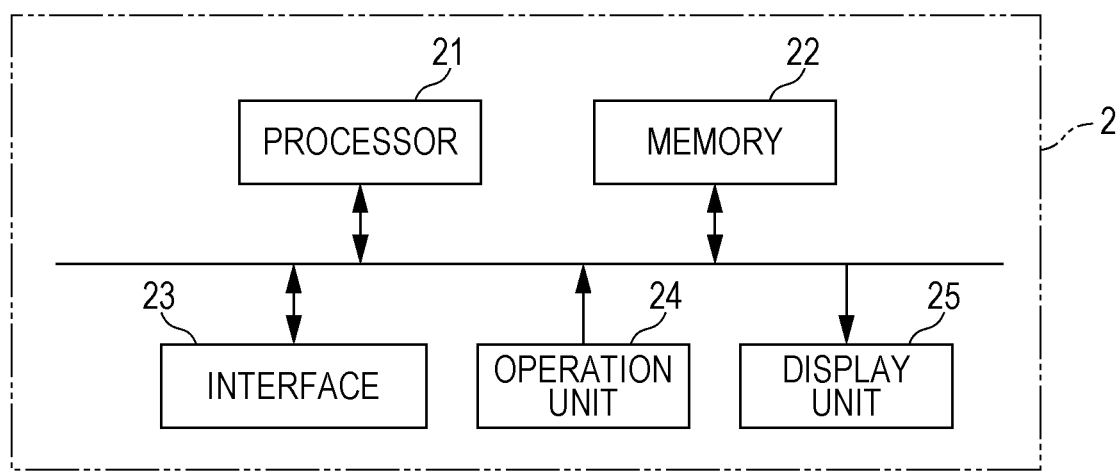
FIG. 6 is a diagram illustrating an example of the configuration of a terminal according to the first exemplary embodiment.

FIG. 6 is a diagram illustrating an example of the configuration of the terminal 2. The terminal 2 illustrated in FIG. 6 includes a processor 21, a memory 22, an interface 23, an operation unit 24, and a display unit 25. These components are connected, for example, through a bus so as to be capable of communicating with each other.

The processor 21 reads out and executes a program stored in the memory 22 to control the individual components of the terminal 2. The processor 21 is, for example, a CPU.

The interface 23 is a communication circuit that connects the terminal 2 to the information processing apparatus 1 through the communication line 3 in a wired or wireless manner such that both are capable of communicating with each other.

The operation unit 24 includes an operator such as an operation button, a keyboard, a touch screen, or a mouse for providing various instructions, receives an operation, and transmits a signal corresponding to the operation to the processor 21.

The display unit 25 includes a display screen such as a liquid crystal display, and displays an image under control by the processor 21. A transparent touch screen of the operation unit 24 may be superimposed on the display screen.

The memory 22 is a storage unit that stores an operating system, various programs, data, and the like that are to be read by the processor 21. The memory 22 includes a RAM and a ROM. The memory 22 may include a solid state drive, a hard disk drive, or the like.

Functional Configuration of Information Processing Apparatus

Figure 7:
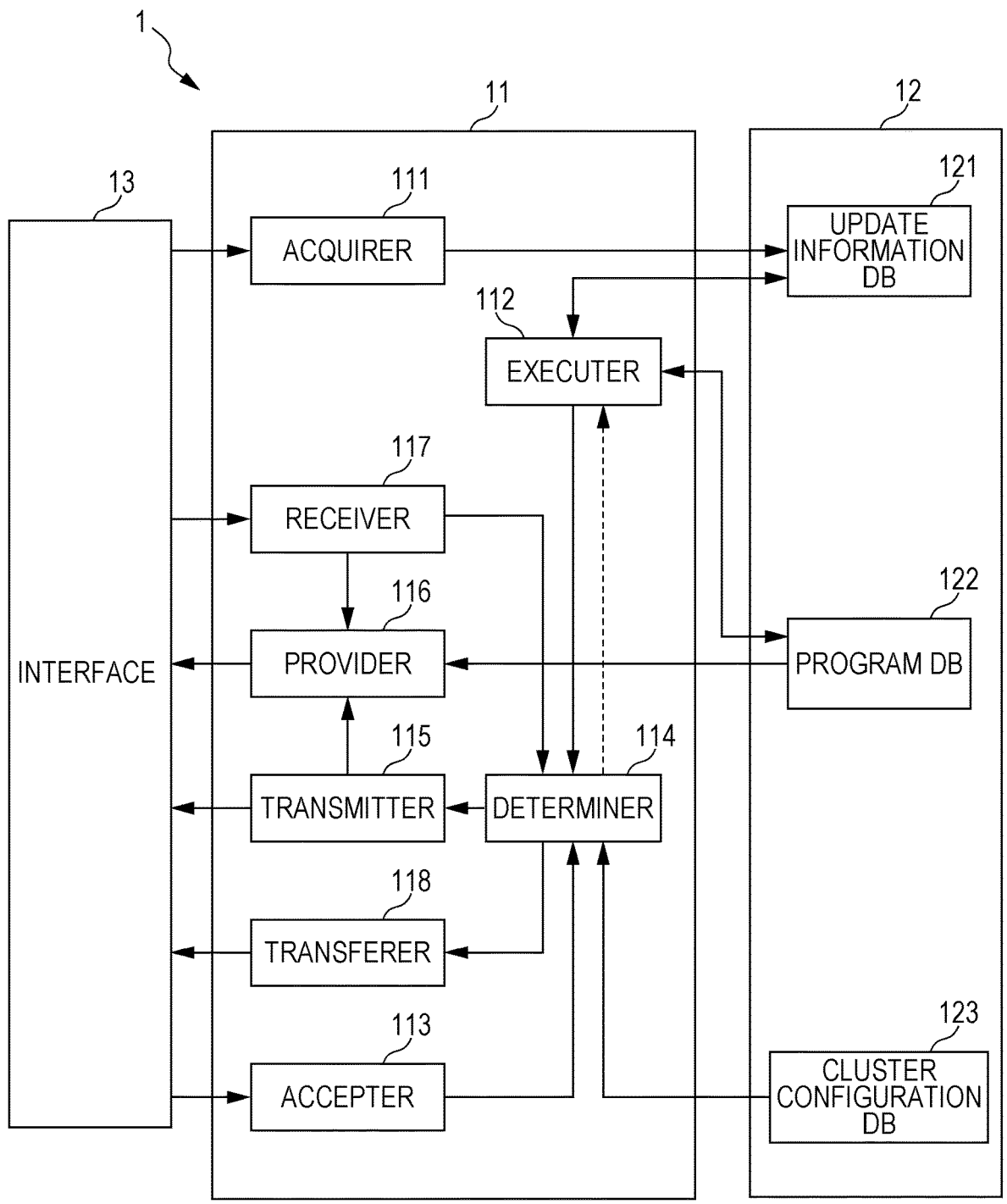
FIG. 7 is a diagram illustrating an example of a functional configuration of the information processing apparatus according to the first exemplary embodiment.

FIG. 7 is a diagram illustrating an example of a functional configuration of the information processing apparatus 1. The processor 11 of the information processing apparatus 1 executes a program stored in the memory 12 to function as an acquirer 111, an executer 112, an accepter 113, a determiner 114, a transmitter 115, a provider 116, and a receiver 117. In addition, the processor 11 illustrated in FIG. 7 functions as a transferer 118.

The acquirer 111 acquires update information from the external apparatus that is not illustrated through the interface 13 and the communication line 3. The update information is information for executing update from an old program (hereinafter referred to as a first program) to a new program (hereinafter referred to as a second program) executed by the processor 11. The acquirer 111 stores the acquired update information in the update information DB 121 of the memory 12.

That is, the processor 11 functioning as the acquirer 111 is an example of a processor configured to acquire update information for executing update from the first program to the second program. The processor 11 that executes the first program before the update is an example of a processor configured to execute the first program.

The executer 112 executes the update from the first program to the second program by using the update information read out from the update information DB 121 of the memory 12 and the first program read out from the program DB 122. That is, the processor 11 functioning as the executer 112 is an example of a processor configured to execute the update by using the update information. The executer 112 stores the second program, acquired by completing the update, in the program DB 122. In addition, the executer 112 stores an update status in the update information DB 121.

The accepter 113 accepts a request for a function from a user from the terminal 2 through the interface 13 and the communication line 3. In the first exemplary embodiment, the accepter 113 accepts a request for a function of the first program until update of the first program is completed in the entire cluster C regardless of whether update of the first program is in progress or is completed in the own information processing apparatus 1. That is, the processor 11 functioning as the accepter 113 is an example of a processor configured to accept a request for a function of the first program in a case where at least one of plural information processing apparatuses constituting a cluster has not completed the update of the first program, the plural information processing apparatuses being the information processing apparatus and one or more other information processing apparatuses.

The processors 11 of the plural information processing apparatuses 1 constituting the cluster C each function as the accepter 113. That is, each of these processors 11 is an example of a processor configured to accept a request for a function of the first program from a terminal in a case where at least one of the plural information processing apparatuses constituting the cluster has not completed the update.

The determiner 114 acquires information in the update information DB 121 and the program DB 122 through the executer 112, acquires a notification received by the receiver 117, and reads out the cluster configuration DB 123 to perform various determinations. The determiner 114 determines an update status of the first program in the own information processing apparatus 1.

In the first exemplary embodiment, the determiner 114 determines whether or not the update of the first program has been completed in the entire cluster C by using the notification received by the receiver 117 and the content of the cluster configuration DB 123. In a case where the update of the first program has not been completed in the entire cluster C, the determiner 114 specifies an information processing apparatus 1 that has not completed the update (hereinafter also referred to as an unupdated apparatus). The above-described executer 112 may start the execution of the above-described update in accordance with a result of the determination by the determiner 114, as indicated by a broken line in FIG. 7.

In a case where the determiner 114 determines that the own information processing apparatus 1 completes the update after all the other information processing apparatuses 1 in the cluster C have completed the update of the first program, the transmitter 115 according to the first exemplary embodiment transmits a notification indicating that the own information processing apparatus 1 is the last apparatus to complete the update to each of the other information processing apparatuses 1 in the cluster C. A notification the sender of which is the last information processing apparatus that has completed the update in a cluster may be hereinafter referred to as a first notification. That is, the processor 11 functioning as the transmitter 115 and the above-described determiner 114 is an example of a processor configured to transmit, in a case where the information processing apparatus completes the update after all the one or more other information processing apparatuses have completed the update, a first notification indicating that the information processing apparatus is the last apparatus to complete the update to each of the one or more other information processing apparatuses.

In a case where the determiner 114 determines that one or more unupdated apparatuses are present in the cluster C when the own information processing apparatus 1 has completed the update, the transmitter 115 according to the first exemplary embodiment selects at least one of the unupdated apparatuses specified by the determiner 114 and transmits a notification indicating that the own information processing apparatus 1 has completed the update of the first program to the selected unupdated apparatus. A notification the sender of which is an information processing apparatus that has completed the update may be hereinafter referred to as a second notification. That is, the processor 11 functioning as the transmitter 115 and the above-described determiner 114 is an example of a processor configured to transmit, in a case where one or more unupdated apparatuses that have not completed the update are present among the one or more other information processing apparatuses when the information processing apparatus has completed the update, a second notification indicating that the information processing apparatus has completed the update to at least one of the one or more unupdated apparatuses.

The provider 116 provides, when each of the plural information processing apparatuses 1 constituting the cluster C executes the update from the first program to the second program, a function of the first program, a function of the second program, and a duplicate function of these programs in accordance with the progress of the update. In the first exemplary embodiment, the provider 116 provides the function of the second program to a user in a case where the determiner 114 determines that all the plural information processing apparatuses 1 constituting the cluster C have completed the update of the first program. That is, the processor 11 functioning as the provider 116 and the above-described determiner 114 is an example of a processor configured to provide the function of the second program to a user in a case where all the plural information processing apparatuses have completed the update of the first program.

Each of the processors 11 of the plural information processing apparatuses 1 constituting the cluster C functions as the provider 116 and the determiner 114. That is, each of these processors 11 is an example of a processor configured to provide the function of the second program to a user of a terminal in a case where all the plural information processing apparatuses constituting the cluster have completed the update of the first program.

For example, when the transmitter 115 transmits the above-described first notification, the determiner 114 determines that all the plural information processing apparatuses 1 constituting the cluster C have completed the update of the first program. The provider 116 starts providing the function of the second program after the transmitter 115 has transmitted the first notification. That is, the processor 11 functioning as the provider 116 is an example of a processor configured to provide the function of the second program after the transmitter 115 has transmitted the first notification.

The receiver 117 receives a first notification and a second notification described above from one of the other information processing apparatuses 1. The receiver 117 illustrated in FIG. 7 receives a request for a function of a program from a user transferred from one of the other information processing apparatuses 1. The determiner 114 monitors the type of the notification received by the receiver 117 and determines the status of update.

For example, in a case where the receiver 117 receives a first notification described above from one of the other information processing apparatuses 1, the information processing apparatus 1 that has transmitted the first notification is the last apparatus to update the first program in the cluster C. At this time, the determiner 114 notifies the provider 116 that the update has been completed in the entire cluster C, and then the provider 116 starts providing the function of the second program. That is, the processor 11 functioning as the provider 116 is an example of a processor configured to provide the function of the second program in a case where a first notification is received from one of the one or more other information processing apparatuses.

In addition, for example, in a case where the receiver 117 receives a second notification described above from one of the other information processing apparatuses 1, the information processing apparatus 1 that has transmitted the second notification has completed the update of the first program but is not the last apparatus to complete the update in the cluster C. In a case where the receiver 117 receives a second notification from one of the other information processing apparatuses 1, the determiner 114 determines, based on the content of the second notification, whether or not one or more unupdated apparatuses are present among the other information processing apparatuses 1.

That is, the processor 11 functioning as the determiner 114 is an example of a processor configured to determine, in a case where a second notification is received from one of the one or more other information processing apparatuses, whether or not the one or more unupdated apparatuses are present among the one or more other information processing apparatuses, based on content of the received second notification.

In a case where the determiner 114 determines that one or more unupdated apparatuses are present among the other information processing apparatuses 1, the determination is notified to the transmitter 115. At this time, the transmitter 115 generates a new second notification by adding information indicating that the own information processing apparatus 1 has completed the update to the content of the second notification received by the receiver 117, and transmits the new second notification to one of the one or more unupdated apparatuses.

That is, the processor 11 functioning as the transmitter 115 is an example of a processor configured to transmit, in a case where the determiner 114 determines that the one or more unupdated apparatuses are present, a new second notification including the content of the received second notification and indicating that the information processing apparatus has completed the update.

On the other hand, in a case where the determiner 114 determines that there is no unupdated apparatus among the other information processing apparatuses 1, the determination is notified to the transmitter 115. After that, in a case where the determiner 114 determines that the update of the first program has been completed in the own information processing apparatus 1, the transmitter 115 transmits a first notification described above to each of the other information processing apparatuses 1 in the cluster C.

That is, the processor 11 functioning as the transmitter 115 is an example of a processor configured to transmit the first notification in a case where the determiner 114 determines that the one or more unupdated apparatuses are absent.

In a case where the accepter 113 accepts a request for the function of the first program from a user after the own information processing apparatus 1 has completed the update of the first program, the transferer 118 transfers the request to an unupdated apparatus. That is, the processor 11 functioning as the transferer 118 is an example of a processor configured to transfer, in a case where the request for the function of the first program is accepted from the user after the information processing apparatus has completed the update, the request to an apparatus that has not completed the update among the one or more other information processing apparatuses.

In a case where a request for the function of the first program is transferred by the transferer 118 implemented by the processor 11 of another information processing apparatus 1, the receiver 117 receives the request. In response to receipt of the request by the receiver 117, the provider 116 provides the requested function of the first program to the terminal 2 of the user who has made the request. That is, the processor 11 functioning as the provider 116 is an example of a processor configured to provide the function indicated in the request in a case where the request is transferred from one of the one or more other information processing apparatuses.

In a case where the memory 12 continuously stores the first program in the program DB 122 in an executable manner after the update from the first program to the second program has been completed, the processor 11 may provide the function of the first program after the completion of the update. In this case, the processor 11 may not function as the above-described transferer 118.

Operation of Information Processing Apparatus

The processor 11 of the information processing apparatus 1 performs an "operation involved in completion of update" and an "operation of switching the function to be provided". In addition, the processor 11 may perform an "operation of transferring a request". The processor 11 performs these operations in parallel. The "operation involved in completion of update" includes an "operation of determining the presence/absence of an unupdated apparatus".

Operation Involved in Completion of Update

Figure 8:
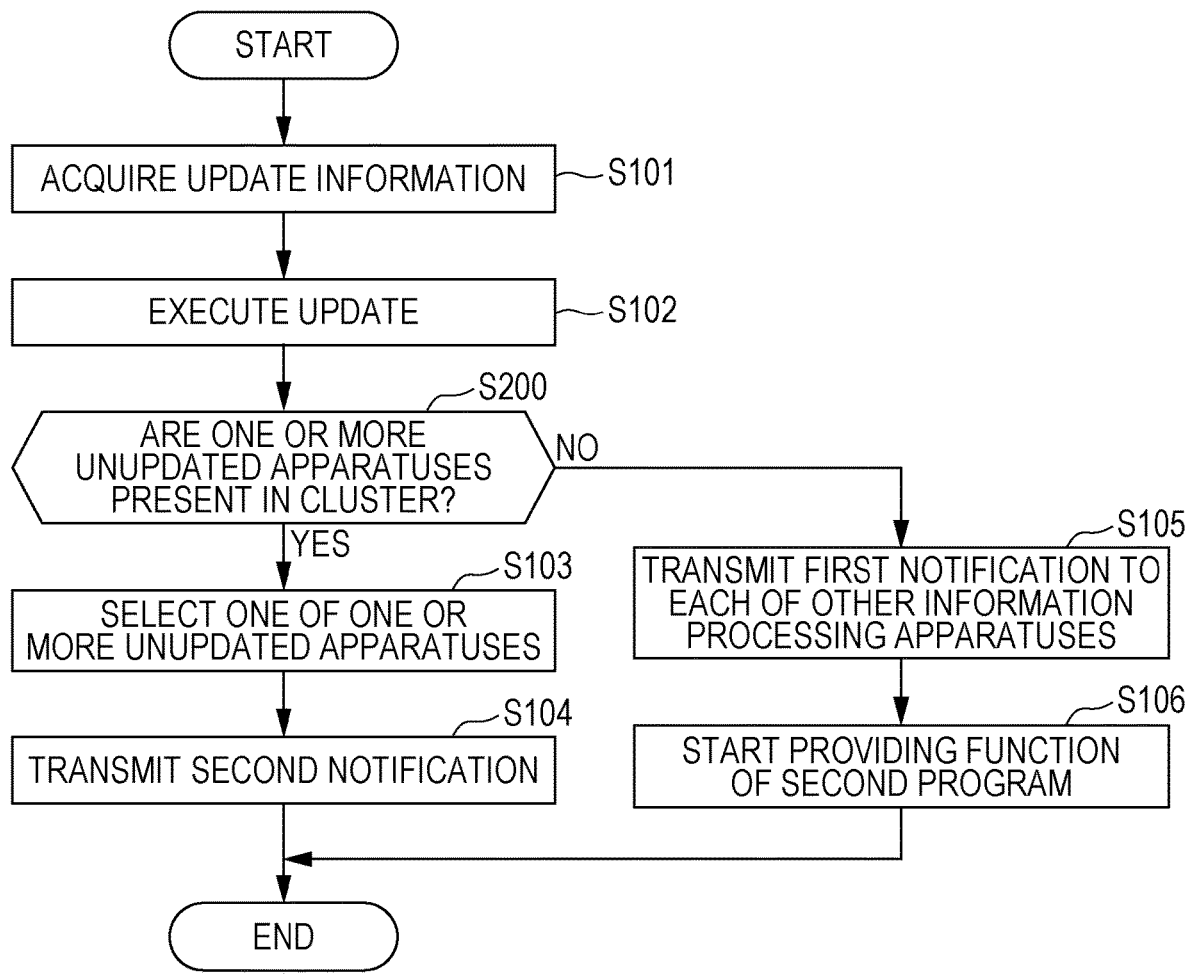
FIG. 8 is a flowchart illustrating an example of a flow of an operation involved in completion of update according to the first exemplary embodiment.

FIG. 8 is a flowchart illustrating an example of a flow of the operation involved in completion of update. The processor 11 of the information processing apparatus 1 acquires update information from the external apparatus that is not illustrated through the communication line 3 (step S101) and executes update by using the update information (step S102).

After the update from the first program to the second program has been completed, the processor 11 determines whether or not one or more unupdated apparatuses are present in the cluster C (step S200).

Operation of Determining the Presence/Absence of Unupdated Apparatus

Figure 9:
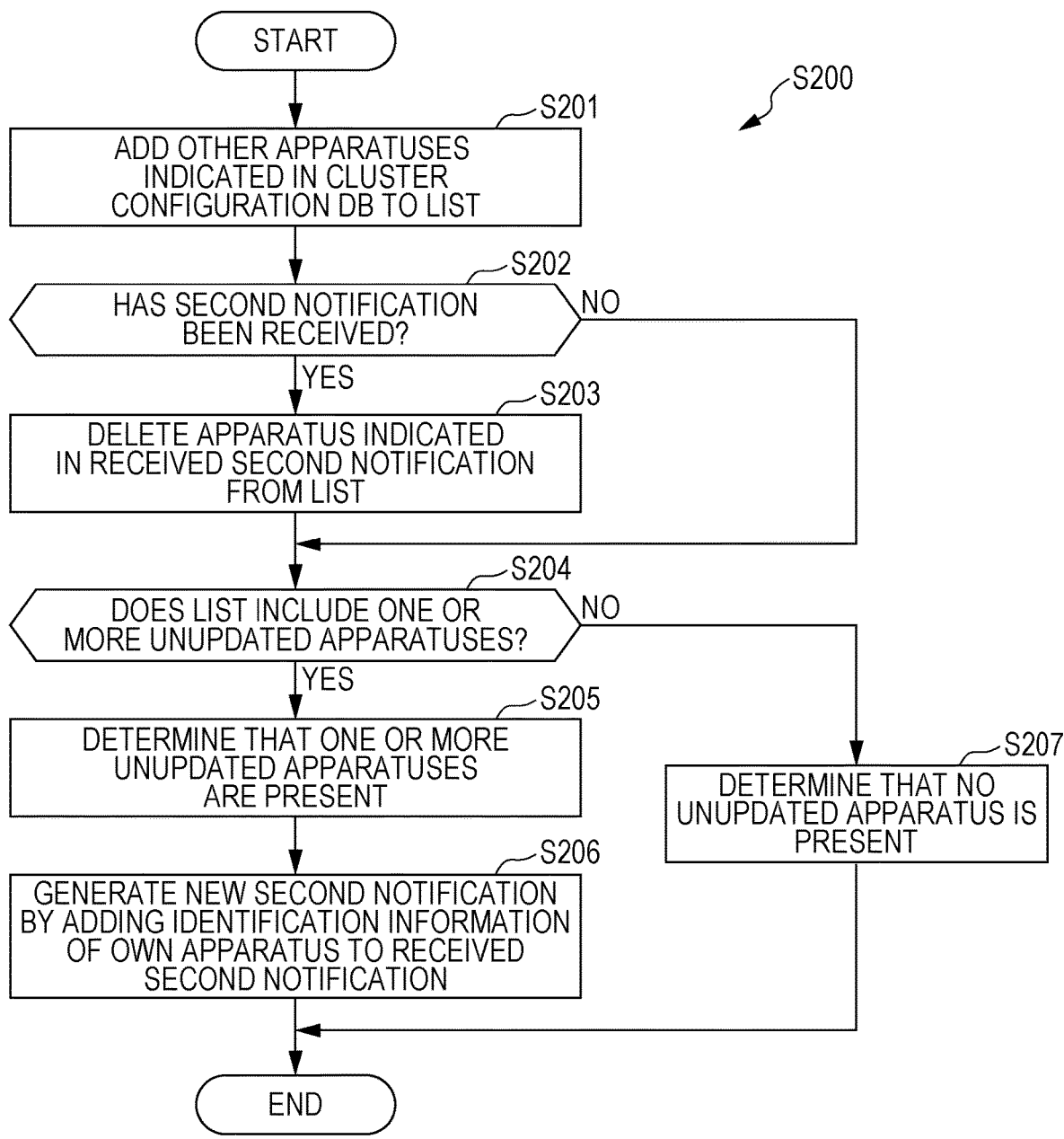
FIG. 9 is a flowchart illustrating an example of a flow of an operation of determining the presence/absence of an unupdated apparatus according to the first exemplary embodiment.

FIG. 9 is a flowchart illustrating an example of a flow of the operation of determining the presence/absence of an unupdated apparatus. The operation illustrated in FIG. 9 is a detailed operation of step S200 in the flowchart illustrated in FIG. 8.

The processor 11 of the information processing apparatus 1 adds the apparatuses other than the own information processing apparatus 1 (i.e., the other information processing apparatuses 1) indicated in the cluster configuration DB 123 to a list of candidate unupdated apparatuses (hereinafter referred to as an unupdated apparatus list) (step S201). The unupdated apparatus list is stored in, for example, the RAM of the memory 22.

Figure 10A:
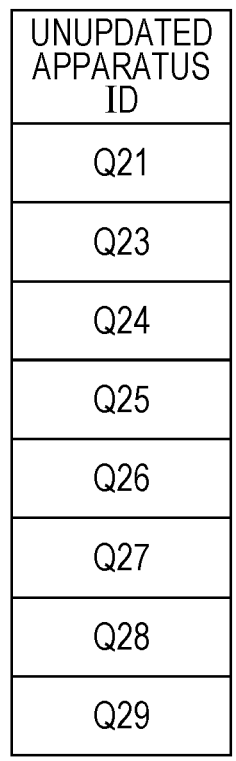
FIGS. 10A and 10B are diagrams each illustrating an example of an unupdated apparatus list according to the first exemplary embodiment.
Figure 10B:
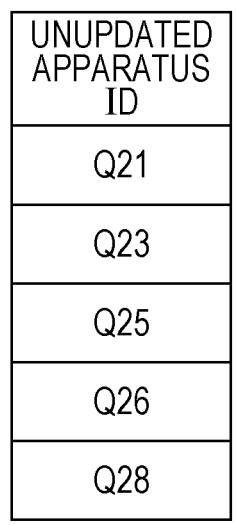

FIGS. 10A and 10B are diagrams each illustrating an example of an unupdated apparatus list. As described above, the cluster configuration DB 123 illustrated in FIG. 5 stores nine apparatus IDs "Q21" to "Q29" as identification information of the information processing apparatuses 1 in which the first program is updated by using the update information identified by the update ID "D01" in the cluster C.

In a case where the update ID of the acquired update information is "D01", the processor 11 of the information processing apparatus 1 specifies the above-described nine apparatus IDs "Q21" to "Q29" as the identification information of the other information processing apparatuses 1 corresponding to the update information. In a case where the identification information of the own information processing apparatus 1 is "Q22", the processor 11 adds the specified apparatus IDs except for "Q22", that is, eight apparatus IDs, to the above-described unupdated apparatus list. Accordingly, the unupdated apparatus list illustrated in FIG. 10A is generated.

Subsequently, as illustrated in FIG. 9, the processor 11 determines whether or not a second notification has been received (step S202). If it is determined that a second notification has been received (YES in step S202), the processor 11 deletes, from the unupdated apparatus list, the identification information of the information processing apparatus 1 indicated in the received second notification (step S203).

On the other hand, if it is determined that a second notification has not been received (NO in step S202), the processor 11 skips step S203 and the process proceeds to step S204.

FIGS. 11A and 11B are diagrams each illustrating an example of a second notification. The second notification illustrated in FIG. 11A is a second notification indicating three apparatus IDs "Q24", "Q27", and "Q29". This second notification means that the update from the first program to the second program has been completed in the information processing apparatuses 1 identified by these three apparatus IDs.

If it is determined that the second notification illustrated in FIG. 11A has been received, the processor 11 of the information processing apparatus 1 deletes the three apparatus IDs indicated in the second notification from the unupdated apparatus list. In a case where the unupdated apparatus list is the one illustrated in FIG. 10A, the three apparatus IDs among the eight apparatus IDs are deleted from the list, and a new unupdated apparatus list illustrated in FIG. 10B is generated. This unupdated apparatus list stores the apparatus IDs "Q21", "Q23", "Q25", "Q26", and "Q28" as candidate unupdated apparatuses.

Subsequently, as illustrated in FIG. 9, the processor 11 determines whether or not the unupdated apparatus list includes one or more apparatus IDs indicating one or more unupdated apparatuses (step S204).

If it is determined that the unupdated apparatus list includes one or more apparatus IDs of one or more unupdated apparatuses (YES in step S204), the processor 11 determines that one or more unupdated apparatuses are present (step S205), and generates a new second notification by adding the identification information of the own information processing apparatus 1 to the received second notification (step S206). That is, the processor 11 is an example of a processor configured to transmit the second notification including the identification information of the information processing apparatus.

On the other hand, if it is determined that the unupdated apparatus list does not include one or more apparatus IDs of one or more unupdated apparatuses (NO in step S204), the processor 11 determines that no unupdated apparatus is present (step S207).

For example, in a case where the unupdated apparatus list illustrated in FIG. 10B has been generated, the processor 11 of the information processing apparatus 1 determines that the unupdated apparatus list includes one or more apparatus IDs of one or more unupdated apparatuses. Subsequently, the processor 11 adds "Q22", which is the apparatus ID of the own information processing apparatus 1, to the received second notification illustrated in FIG. 11A to generate a new second notification illustrated in FIG. 11B. The description given above is the details of the operation of determining the presence/absence of an unupdated apparatus in step S200.

As illustrated in FIG. 8, if it is determined that one or more unupdated apparatuses are present in the cluster C (YES in step S200), the processor 11 selects one of the one or more unupdated apparatuses (step S103), transmits the second notification to the selected unupdated apparatus (step S104), and ends the process.

On the other hand, if it is determined that no unupdated apparatus is present in the cluster C (NO in step S200), the processor 11 transmits a first notification to each of the other information processing apparatuses 1 in the cluster C (step S105), starts providing the function of the second program (step S106), and ends the process.

Operation of Switching Function to be Provided

Figure 12:
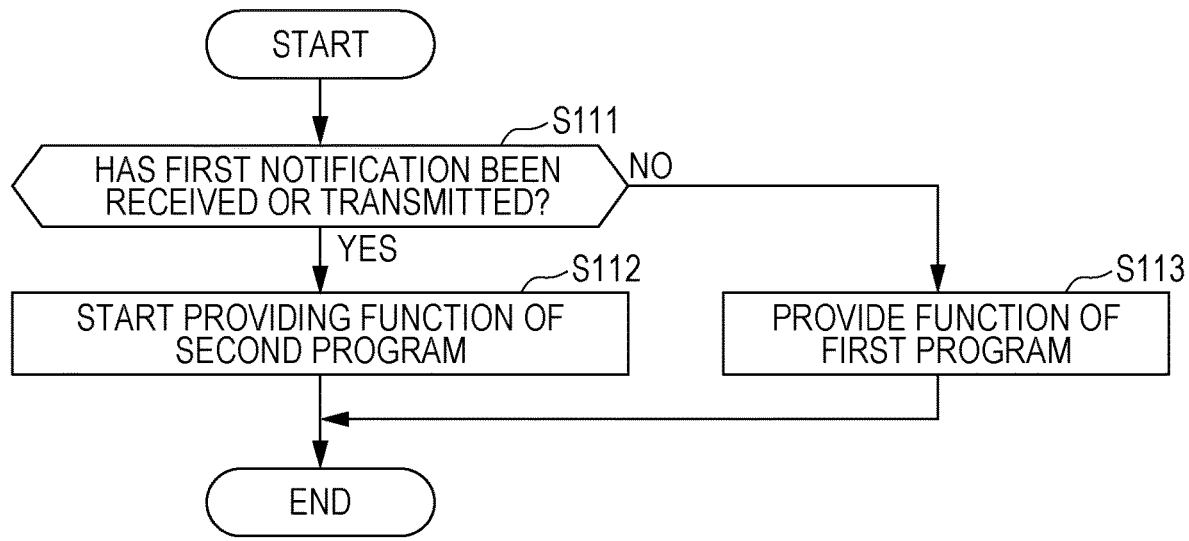
FIG. 12 is a flowchart illustrating an example of a flow of an operation of switching a function to be provided according to the first exemplary embodiment.

FIG. 12 is a flowchart illustrating an example of a flow of the operation of switching the function to be provided. The processor 11 of the information processing apparatus 1 determines whether or not a first notification has been received or transmitted (step S111).

If it is determined that a first notification has been received or transmitted (YES in step S111), the processor 11 starts providing the function of the second program (step S112). Accordingly, the processor 11 switches provision of the function of the first program in the own information processing apparatus 1 to provision of the function of updated second program. Because the first notification has been transmitted to all the information processing apparatuses 1 in the cluster C, the function to be provided is switched also in the other information processing apparatuses 1 in synchronization with the own information processing apparatus 1.

On the other hand, if it is determined that a first notification has not been received or transmitted (NO in step S111), the processor 11 continues providing the function of the first program (step S113).

Operation of Transferring Request

Figure 13:
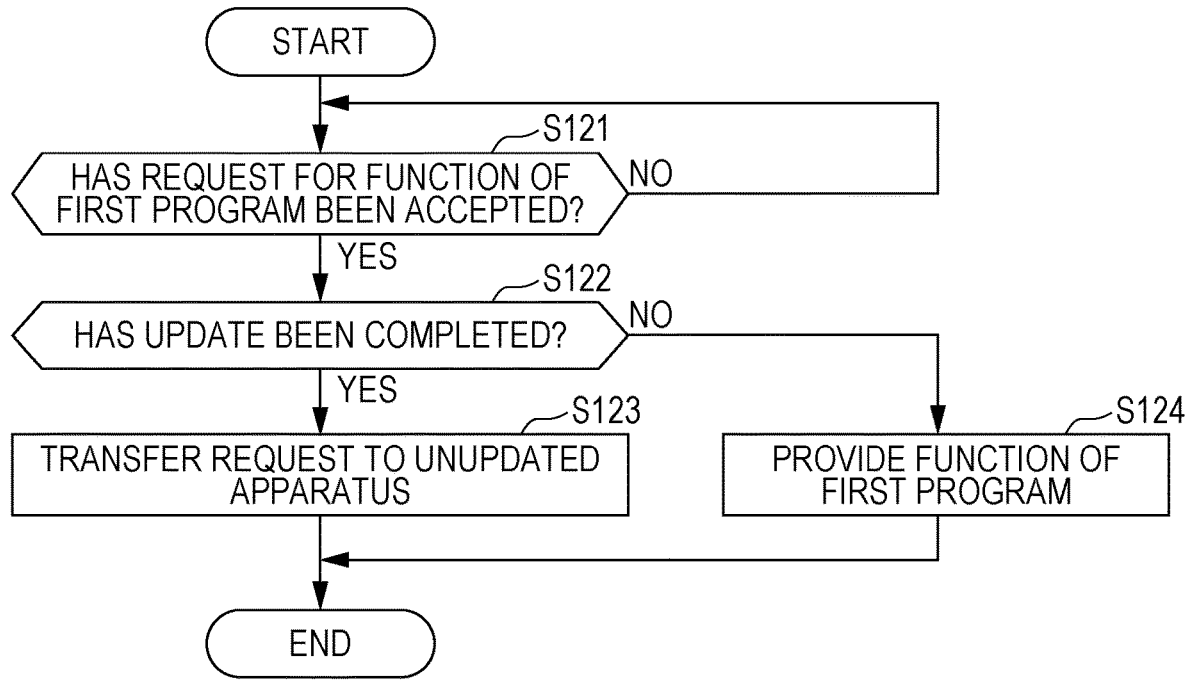
FIG. 13 is a flowchart illustrating an example of a flow of an operation of transferring a request according to the first exemplary embodiment.

FIG. 13 is a flowchart illustrating an example of a flow of the operation of transferring a request. The processor 11 of the information processing apparatus 1 determines whether or not a request for the function of the first program has been accepted from a user through one of the terminals 2 and the communication line 3 in the information processing system 9 (step S121).

If it is determined that a request for the function of the first program has not been accepted (NO in step S121), the processor 11 continues the determination in step S121.

On the other hand, if it is determined that a request for the function of the first program has been accepted (YES in step S121), the processor 11 determines whether or not the update from the first program to the second program has been completed in the own information processing apparatus 1 (step S122).

If it is determined that the above-described update has been completed (YES in step S122), the processor 11 transfers the accepted request to one of the unupdated apparatuses (step S123).

On the other hand, if it is determined that the above-described update has not been completed (NO in step S122), the processor 11 provides the function of the first program in response to the accepted request (step S124).

As a result of performing the above-described operations, the plural information processing apparatuses 1 constituting the cluster C continue providing the function of the first program until one of the information processing apparatuses 1 completes the update from the first program to the second program, and after all the information processing apparatuses 1 have completed the update, the information processing apparatuses 1 simultaneously start providing the function of the second program. Thus, users who use the cluster C are provided with the same function at the same timing regardless of the information processing apparatuses 1 assigned thereto. In the first exemplary embodiment, the updated function is not requested from a user before the update of the program is completed in the entire cluster C, and thus confusion resulting from being unable to provide the function does not occur.

That is, in the information processing system 9 according to the first exemplary embodiment, when each of the plural information processing apparatuses 1 constituting the cluster C updates the first program to the second program, variation in functions provided by the individual information processing apparatuses 1 to users may be suppressed.

MODIFICATION EXAMPLES OF FIRST EXEMPLARY EMBODIMENT

The first exemplary embodiment described above may be modified in the following manner. The following modification examples may be combined with each other.

First Modification Example of First Exemplary Embodiment

In the above-described first exemplary embodiment, the cluster C does not include a management apparatus that manages the information processing apparatuses 1, but the cluster may include a management apparatus. In this case, each of the plural information processing apparatuses 1 constituting the cluster does not need to transmit at least one of a first notification or a second notification to the other information processing apparatuses 1.

Figure 14:
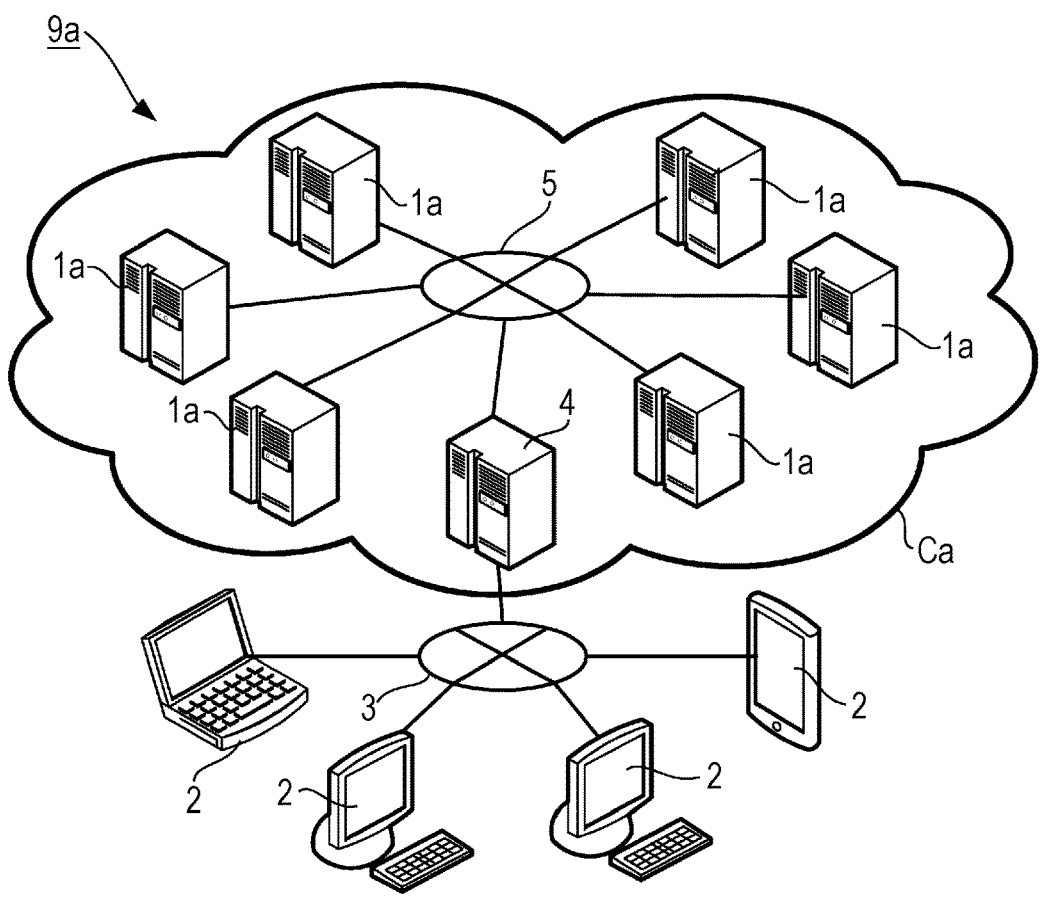
FIG. 14 is a diagram illustrating an example of an overall configuration of an information processing system according to a first modification example of the first exemplary embodiment.

FIG. 14 is a diagram illustrating an example of an overall configuration of an information processing system 9a according to a first modification example. The information processing system 9a includes plural information processing apparatuses 1a, the terminals 2, the communication line 3, and a management apparatus 4. The management apparatus 4 constitute a cluster Ca together with the information processing apparatuses 1a. The management apparatus 4 is a computer that manages the information processing apparatuses 1a constituting the cluster Ca together. That is, the information processing system 9a including the management apparatus 4 is an example of an information processing system that includes a terminal and plural information processing apparatuses constituting a cluster and that includes a management apparatus that manages the plural information processing apparatuses.

Figure 15:
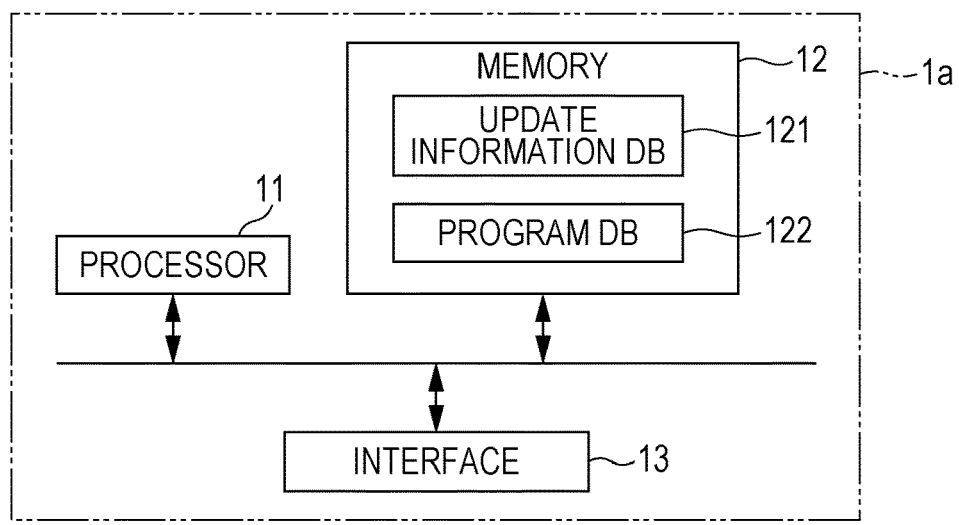
FIG. 15 is a diagram illustrating an example of the configuration of an information processing apparatus according to the first modification example of the first exemplary embodiment.

FIG. 15 is a diagram illustrating an example of the configuration of the information processing apparatus 1a according to the first modification example. As illustrated in FIG. 15, the information processing apparatus 1a has the same configuration as that of the information processing apparatus 1 illustrated in FIG. 2 except that the memory 12 does not store the cluster configuration DB 123. Thus, the plural information processing apparatuses 1a are an example of plural information processing apparatuses each including a processor that executes the first program.

Figure 16:
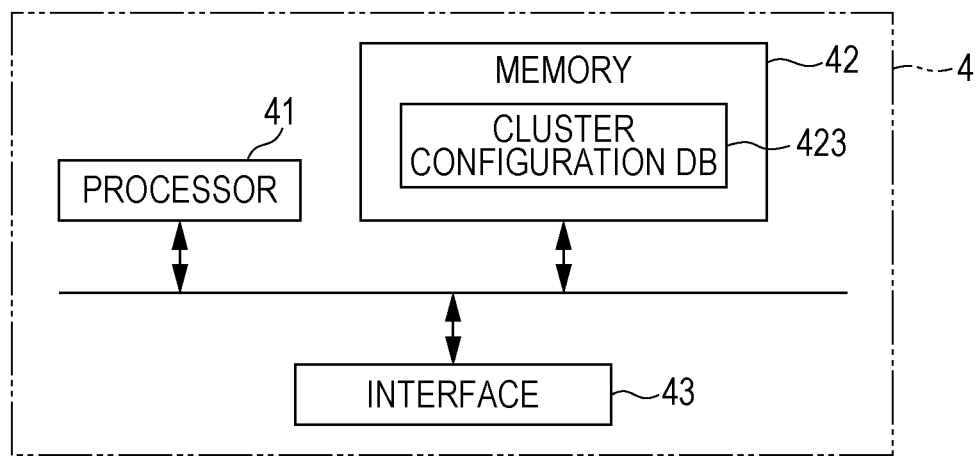
FIG. 16 is a diagram illustrating an example of the configuration of a management apparatus according to the first modification example of the first exemplary embodiment.

FIG. 16 is a diagram illustrating an example of the configuration of the management apparatus 4 according to first modification example. The management apparatus 4 illustrated in FIG. 16 includes a processor 41, a memory 42, and an interface 43. These components have the same configurations as those of the processor 11, the memory 12, and the interface 13 of the information processing apparatus 1a, respectively, except that the database stored in the memory 42 is different. The memory 42 of the management apparatus 4 illustrated in FIG. 16 stores a cluster configuration DB 423.

Figure 17:
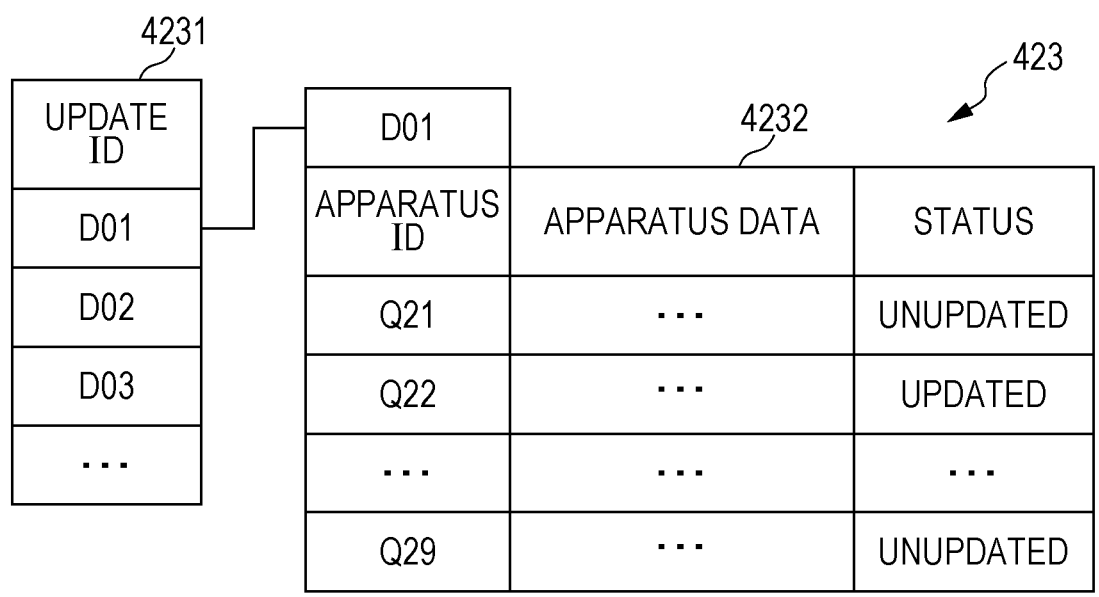
FIG. 17 is a diagram illustrating an example of the configuration of a cluster configuration DB according to the first modification example of the first exemplary embodiment.

FIG. 17 is a diagram illustrating an example of the configuration of the cluster configuration DB 423. The cluster configuration DB 423 illustrated in FIG. 17 is a database that stores information indicating the configuration of the cluster Ca to which the information processing apparatuses 1a belong. The cluster configuration DB 423 illustrated in FIG. 17 has an update ID list 4231 and an apparatus list 4232. The update ID list 4231 has the same configuration as that of the update ID list 1231 in the cluster configuration DB 123 illustrated in FIG. 5.

On the other hand, the apparatus list 4232 in the cluster configuration DB 423 is different in being provided with a field indicating the "status" of update of the information processing apparatuses 1a identified by the respective apparatus IDs, in addition to the apparatus list 1232 illustrated in FIG. 5. When the processor 41 of the management apparatus 4 receives a notification indicating that update has been completed (hereinafter referred to as a completion notification) from each information processing apparatus 1a, the processor 41 rewrites the field "status" in accordance with the notification. For example, when the processor 41 receives a completion notification from one of the information processing apparatuses 1a, the processor 41 rewrites the field "status" corresponding to the identification information of the information processing apparatus 1a from "unupdated" indicating that update has not been completed to "updated" indicating that update has been completed.

Operation Involved in Completion of Update in First Modification Example

Figure 18:
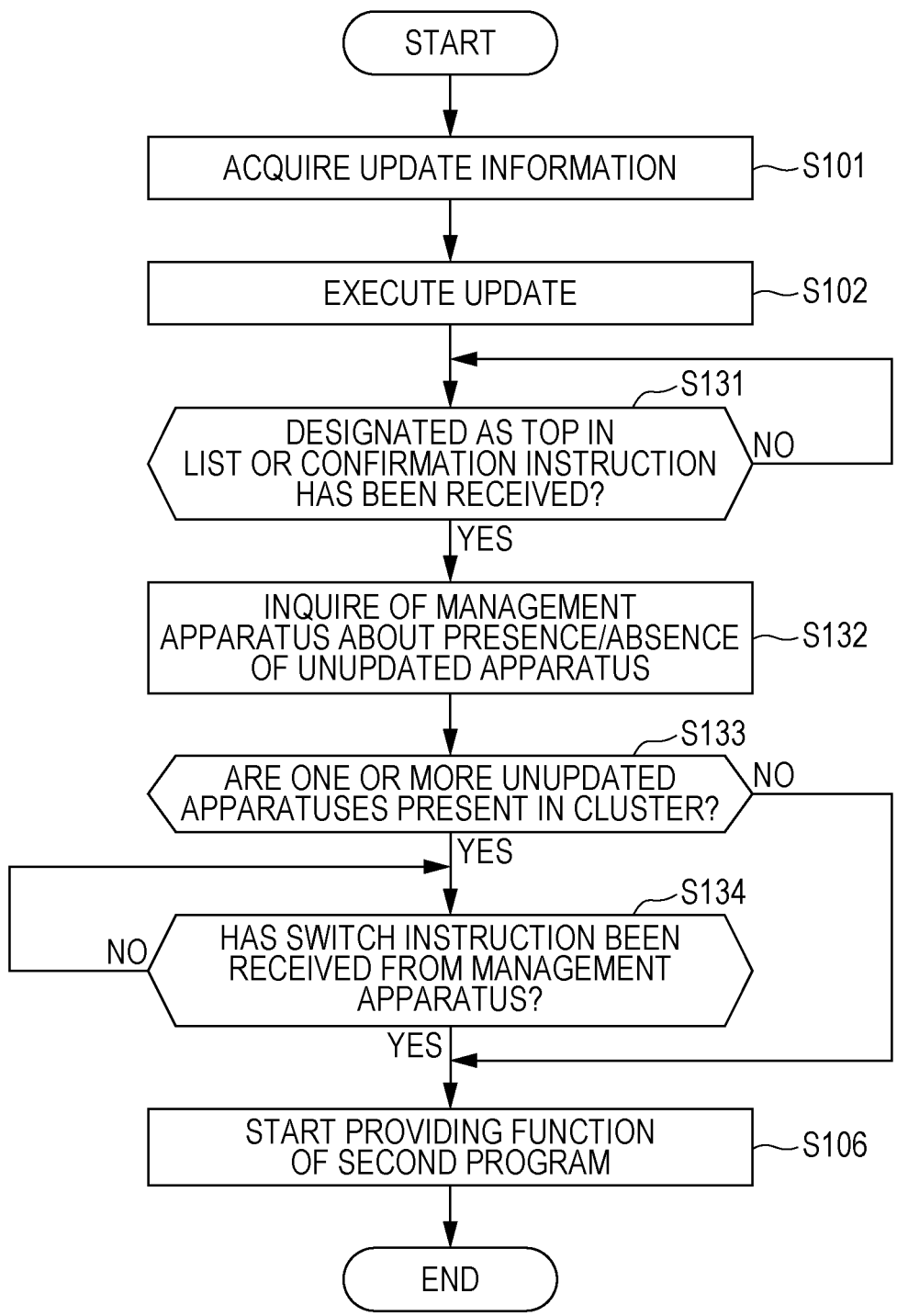
FIG. 18 is a flowchart illustrating an example of a flow of an operation involved in completion of update according to the first modification example of the first exemplary embodiment.

FIG. 18 is a flowchart illustrating an example of a flow of an operation involved in completion of update according to the first modification example. The processor 11 of the information processing apparatus 1a acquires update information from the external apparatus that is not illustrated through the communication line 3 (step S101), and executes update by using the update information (step S102).

After the update from the first program to the second program has been completed, the processor 11 determines whether the own information processing apparatus 1a is at the top in a list (not illustrated) indicating the order in which the update is executed among the information processing apparatuses 1a or whether an instruction to promote confirmation of update (hereinafter referred to as a confirmation instruction) has been received from the management apparatus 4 (step S131).

If it is determined that the own information processing apparatus 1a is not at the top in the list and that a confirmation instruction has not been received from the management apparatus 4 (NO in step S131), the processor 11 continues the determination in step S131.

On the other hand, if it is determined that the own information processing apparatus 1a is at the top in the list or that a confirmation instruction has been received from the management apparatus 4 (YES in step S131), the processor 11 transmits the above-described completion notification indicating that update in the own information processing apparatus 1a has been completed and inquires of the management apparatus 4 about the presence/absence of an unupdated apparatus (step S132). That is, the processor 11 that transmits a completion notification to the management apparatus 4 is an example of a processor configured to notify a management apparatus that update has been completed when the update has been completed.

Operation of Management Apparatus in First Modification Example

Figure 19:
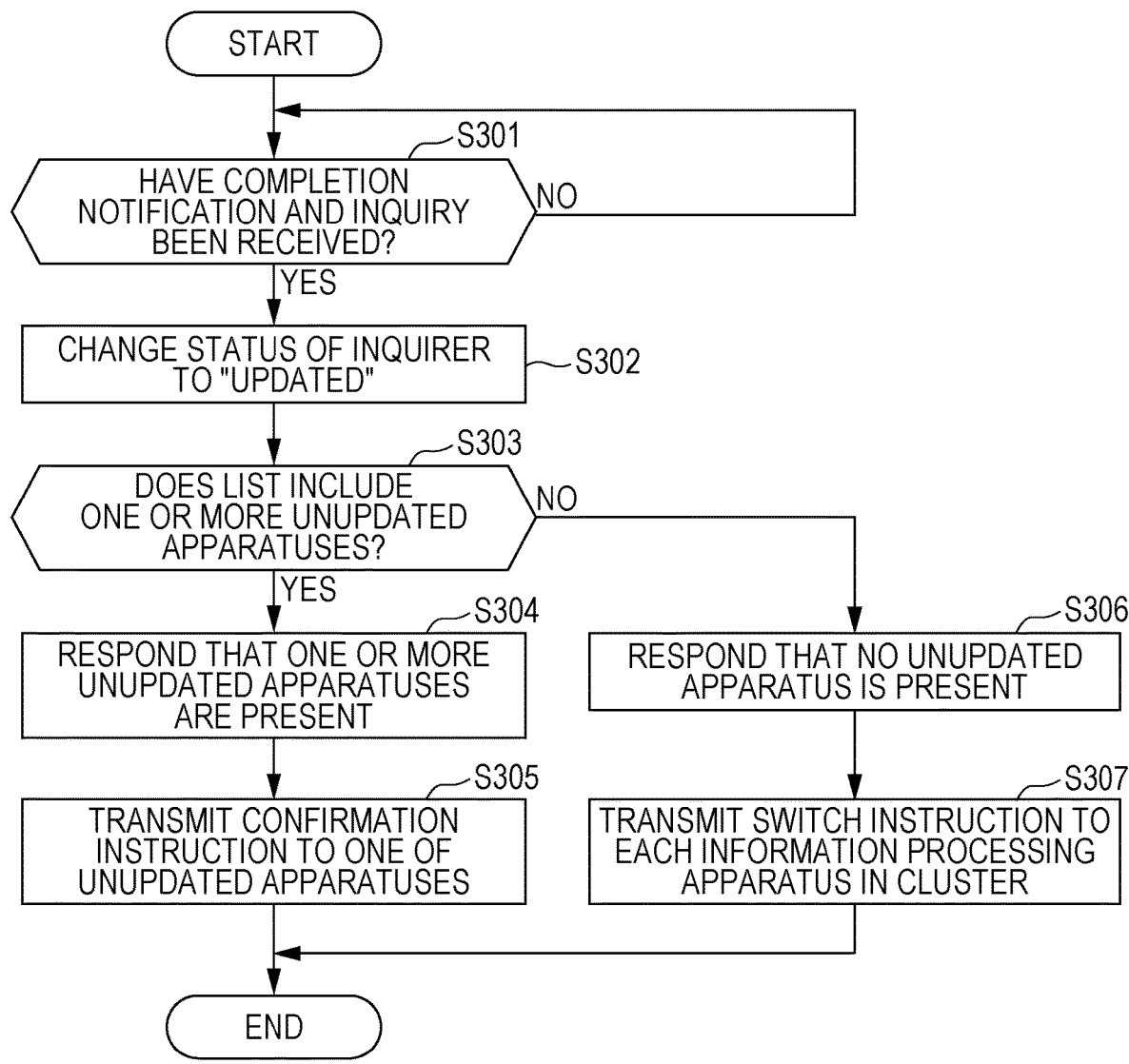
FIG. 19 is a flowchart illustrating an example of a flow of an operation of the management apparatus according to the first modification example of the first exemplary embodiment.

FIG. 19 is a flowchart illustrating an example of a flow of the operation of the management apparatus 4. The processor 41 of the management apparatus 4 determines whether or not a completion notification and an inquiry described above have been received (step S301). As long as it is determined that a completion notification and an inquiry have not been received (NO in step S301), the processor 41 continues the determination.

On the other hand, if it is determined that a completion notification and an inquiry described above have been received (YES in step S301), the processor 41 reads out the cluster configuration DB 423 from the memory 42 and changes, in the above-described apparatus list 4232, the field of "status" corresponding to the apparatus ID of the information processing apparatus 1a as the inquirer to "updated" indicating that update has been completed (step S302).

Subsequently, the processor 41 determines whether or not the apparatus list 4232 in the cluster configuration DB 423 includes one or more apparatuses in which the update has not been completed, that is, one or more unupdated apparatuses (step S303).

If it is determined that one or more unupdated apparatuses are included in the apparatus list 4232 (YES in step S303), the processor 41 responds, to the above-described inquiry, that one or more unupdated apparatuses are present (step S304) and transmits a confirmation instruction to one of the one or more unupdated apparatuses (step S305). Accordingly, the unupdated apparatus to which the confirmation instruction is transmitted is promoted to confirm the update.

On the other hand, if it is determined that no unupdated apparatus is included in the apparatus list 4232 (NO in step S303), the processor 41 responds, to the above-described inquiry, that no unupdated apparatus is present (step S306), and transmits an instruction to switch the function to be provided (hereinafter referred to as a switch instruction) to each of the information processing apparatuses 1a in the cluster Ca (step S307). The description given above is the details of the operation in which the management apparatus 4 responds to the inquiry from the information processing apparatus 1a.

Subsequently, as illustrated in FIG. 18, the processor 11 of the information processing apparatus 1a determines, in accordance with the response from the management apparatus 4, whether or not one or more unupdated apparatuses are present in the cluster Ca (step S133).

If it is determined that no unupdated apparatus is present in the cluster Ca (NO in step S133), the processor 11 proceeds to step S106.

On the other hand, if it is determined that one or more unupdated apparatuses are present in the cluster Ca (YES in step S133), the processor 11 determines whether or not a switch instruction has been received from the management apparatus 4 (step S134).

If it is determined that a switch instruction has not been received from the management apparatus 4 (NO in step S134), the processor 11 continues the determination.

On the other hand, if it is determined that a switch instruction has been received from the management apparatus (YES in step S134), the processor 11 starts providing the function of the second program (step S106).

Accordingly, the processor 11 of the information processing apparatus 1a starts providing the function of the second program if the management apparatus 4 determines, in response to an inquiry, that no unupdated apparatus is present and if the own information processing apparatus 1a has received a switch instruction from the management apparatus 4, and thus variation in the functions provided to users by the plural information processing apparatuses 1a constituting the cluster Ca may be suppressed.

The processor 11 of the information processing apparatus 1a inquires of the management apparatus 4 about whether or not one or more unupdated apparatuses are present. Alternatively, the processor 11 may request information indicating whether or not each of the plural information processing apparatuses 1a constituting the cluster Ca has completed the update and may acquire the information. With this inquiry, the processor 11 is able to acquire a determination result indicating that an unupdated apparatus is present and specify which information processing apparatus 1a is an unupdated apparatus.

In addition, for example, in a case where the first program is overwritten and becomes unexecutable as a result of completion of the update from the first program to the second program, if the function of the first program is requested from a user after the update has been completed in the own information processing apparatus 1a, the own information processing apparatus 1a is incapable of providing the requested function. At this time, the processor 11 may make the above-described request to specify an unupdated apparatus. The processor 11 may then transfer the request for the function of the first program accepted from the user to the specified unupdated apparatus. In this case, the processor 11 is an example of a processor configured to acquire from the management apparatus information indicating whether or not each of the plural information processing apparatuses has completed the update of the first program.

Second Modification Example of First Exemplary Embodiment

In the above-described first exemplary embodiment, the order of executing the update from the first program to the second program is not determined among the plural information processing apparatuses 1 constituting the cluster C, but the order may be determined in advance.

Figure 20:
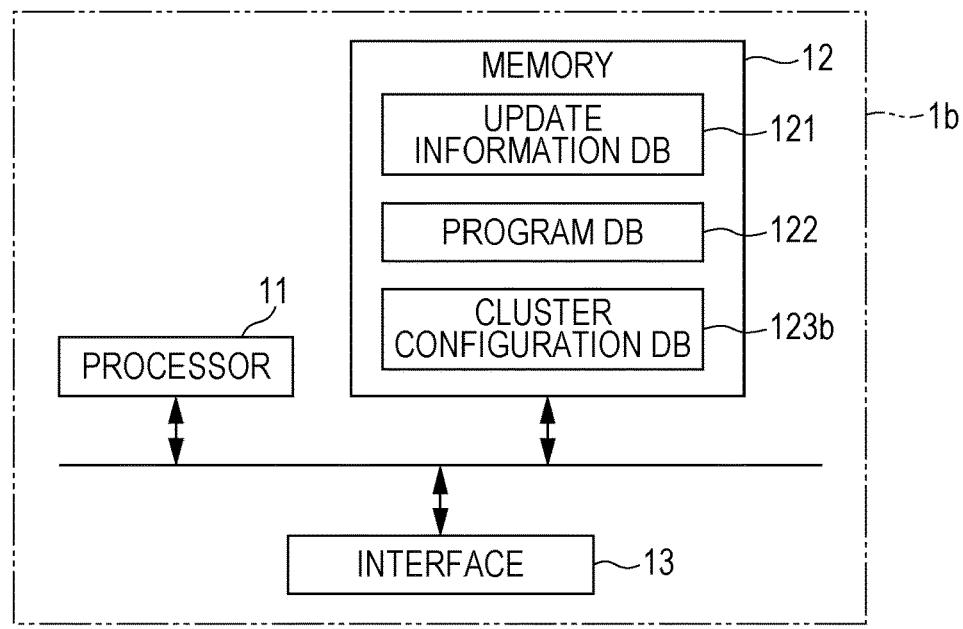
FIG. 20 is a diagram illustrating an example of the configuration of an information processing apparatus according to a second modification example of the first exemplary embodiment.

FIG. 20 is a diagram illustrating an example of the configuration of an information processing apparatus 1b according to a second modification example. For this information processing apparatus 1b, the order of executing the update is determined in advance. The information processing apparatus 1b illustrated in FIG. 20 is different from the information processing apparatus 1 illustrated in FIG. 2 in that the memory 12 stores a cluster configuration DB 123b instead of the cluster configuration DB 123.

Figure 21:
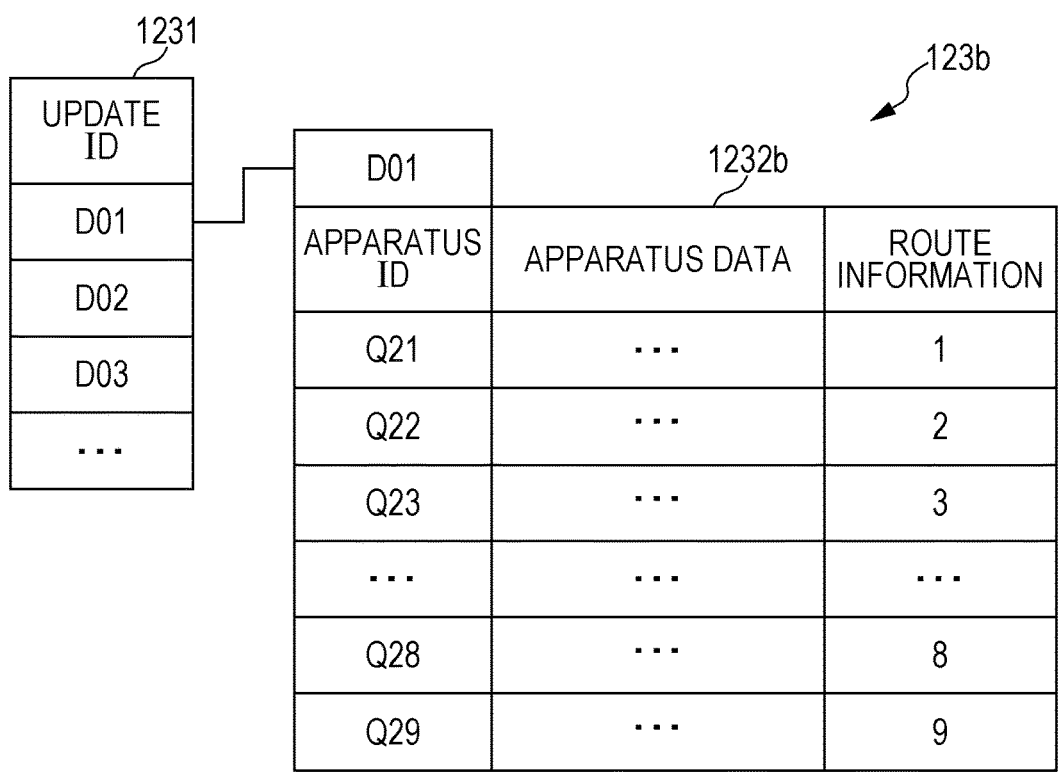
FIG. 21 is a diagram illustrating an example of the configuration of a cluster configuration DB according to the second modification example of the first exemplary embodiment.

FIG. 21 is a diagram illustrating an example of the configuration of the cluster configuration DB 123b according to the second modification example. The cluster configuration DB 123b illustrated in FIG. 21 has the update ID list 1231 and an apparatus list 1232b.

Figure 22:
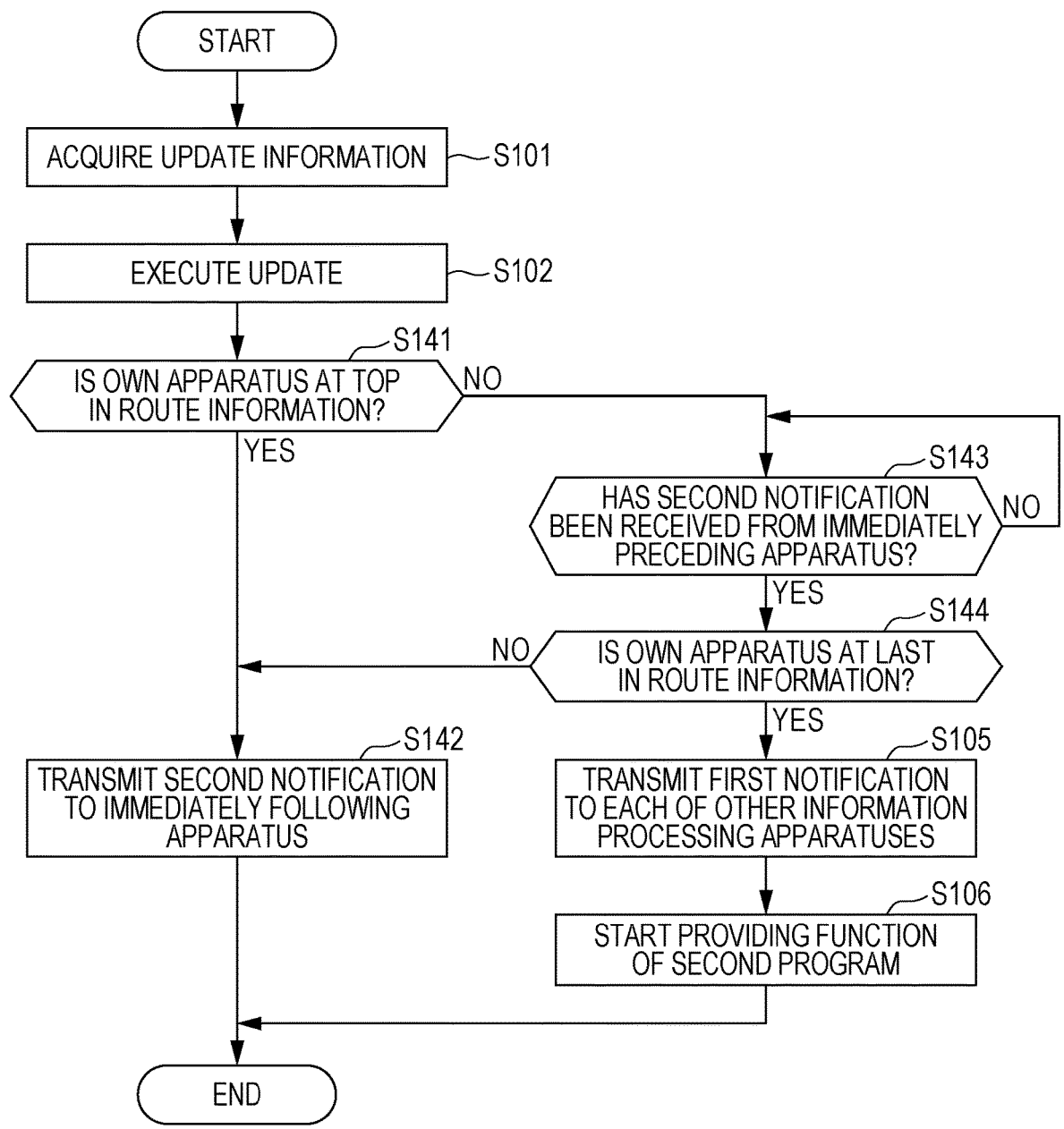
FIG. 22 is a flowchart illustrating an example of a flow of an operation involved in completion of update according to the second modification example of the first exemplary embodiment.

The apparatus list 1232b in the cluster configuration DB 123b is different from the apparatus list 1232 illustrated in FIG. 5 in that a field indicating "route information" of the update of the information processing apparatuses 1b identified by the respective apparatus IDs is further provided. The "route information" is information indicating the order of the update among the information processing apparatuses 1b and is represented by, for example, a positive integer.
Operation Involved in Completion of Update in Second Modification Example FIG. 22 is a flowchart illustrating an example of a flow of an operation involved in completion of update in the second modification example. The processor 11 of the information processing apparatus 1b acquires update information from the external apparatus that is not illustrated through the communication line 3 (step S101), and executes update by using the update information (step S102).

After the update from the first program to the second program has been completed, the processor 11 refers to the cluster configuration DB 123b to determine whether or not the own information processing apparatus 1b is at the top in the route information (step S141).

For example, if the "route information" in the apparatus list 1232b in the cluster configuration DB 123b indicates "1", the processor 11 determines that the own information processing apparatus 1b is at the top in the route information (YES in step S141), and transmits a second notification to the immediately following information processing apparatus 1b (in this case, for example, the information processing apparatus 1b associated with the route information "2") (step S142).

On the other hand, if it is determined that the own information processing apparatus 1b is not at the top in the route information (NO in step S141), the processor 11 determines whether or not a second notification has been received from the immediately preceding information processing apparatus 1b according to the route information (step S143), and continues the determination as long as it is determined that a second notification has not been received (NO in step S143).

On the other hand, if it is determined that a second notification has been received from the immediately preceding information processing apparatus 1b according to the route information (YES in step S143), the processor 11 determines whether or not the own information processing apparatus 1b is at the last in the route information (step S144).

The state in which the own information processing apparatus 1b is at the last in the route information means that completion of the update in the own information processing apparatus 1b is the last completion of the update in the cluster C. That is, the processor 11 is an example of a processor configured to determine, based on route information indicating a predetermined route included in the update information, whether or not the information processing apparatus is the last apparatus to complete the update.

If it is determined that the own information processing apparatus 1b is not at the last in the route information (NO in step S144), the processor 11 proceeds to step S142, and transmits a second notification to the immediately following information processing apparatus 1b (in this case, for example, the information processing apparatus 1b associated with the route information larger by 1 than the route information of the own information processing apparatus 1b) (step S142).

If it is determined that the own information processing apparatus 1b is at the last in the route information (YES in step S144), the processor 11 transmits a first notification to each of the other information processing apparatuses 1b in the cluster C (step S105), starts providing the function of the second program (step S106), and ends the process.

Third Modification Example of First Exemplary Embodiment

Figure 23:
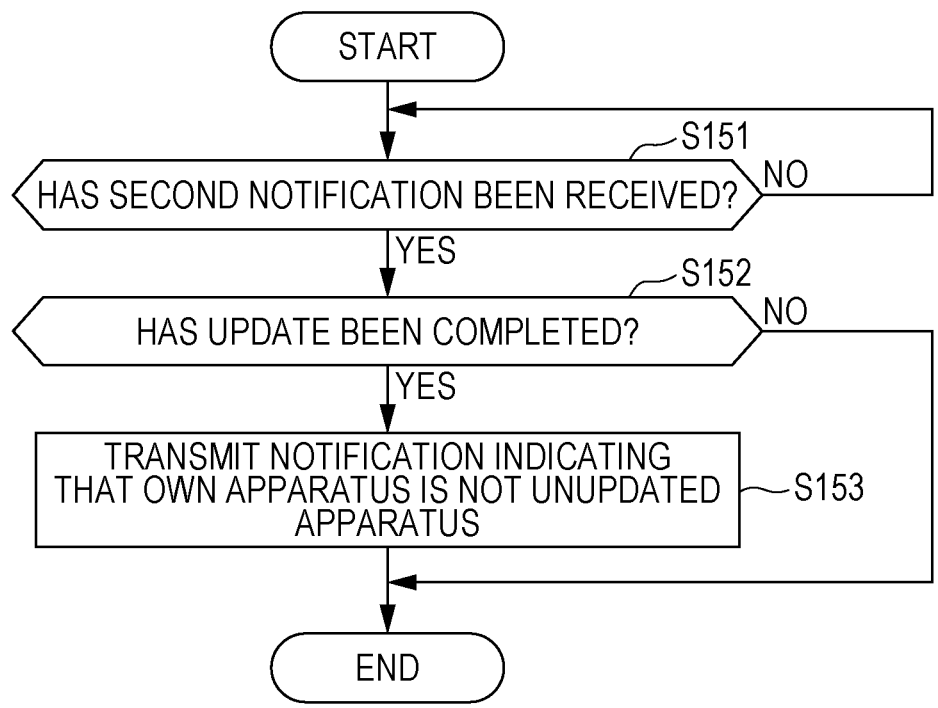
FIG. 23 is a flowchart illustrating an example of a flow of an operation of responding to a received second notification according to a third modification example of the first exemplary embodiment.

In the above-described first exemplary embodiment, a second notification is transmitted to one of unupdated apparatuses specified by the processor 11, but the exemplary embodiment is not limited thereto. For example, when plural information processing apparatuses 1 are executing the update in parallel in the cluster C, the destination specified as an unupdated apparatus may have already completed the update. Thus, the information processing apparatus 1 may modify candidate unupdated apparatuses when receiving a response to a second notification.
Operation of Responding to Second Notification in Third Modification Example FIG. 23 is a flowchart illustrating an example of a flow of an operation of responding to a received second notification. The processor 11 of the information processing apparatus 1 determines whether or not a second notification has been received from another information processing apparatus 1 (step S151), and continues the determination as long as it is determined that a second notification has not been received (NO in step S151).

On the other hand, if it is determined that a second notification has been received (YES in step S151), the processor 11 determines whether or not the update has been completed in the own information processing apparatus 1 (step S152). If it is determined that the update has not been completed in the own information processing apparatus 1 (NO in step S152), the processor 11 ends the process.

On the other hand, if it is determined that the update has been completed in the own information processing apparatus 1 (YES in step S152), the processor 11 transmits a notification indicating that the own information processing apparatus 1 is not an unupdated apparatus to the information processing apparatus 1 that has transmitted the second notification (step S153).

Figure 24:
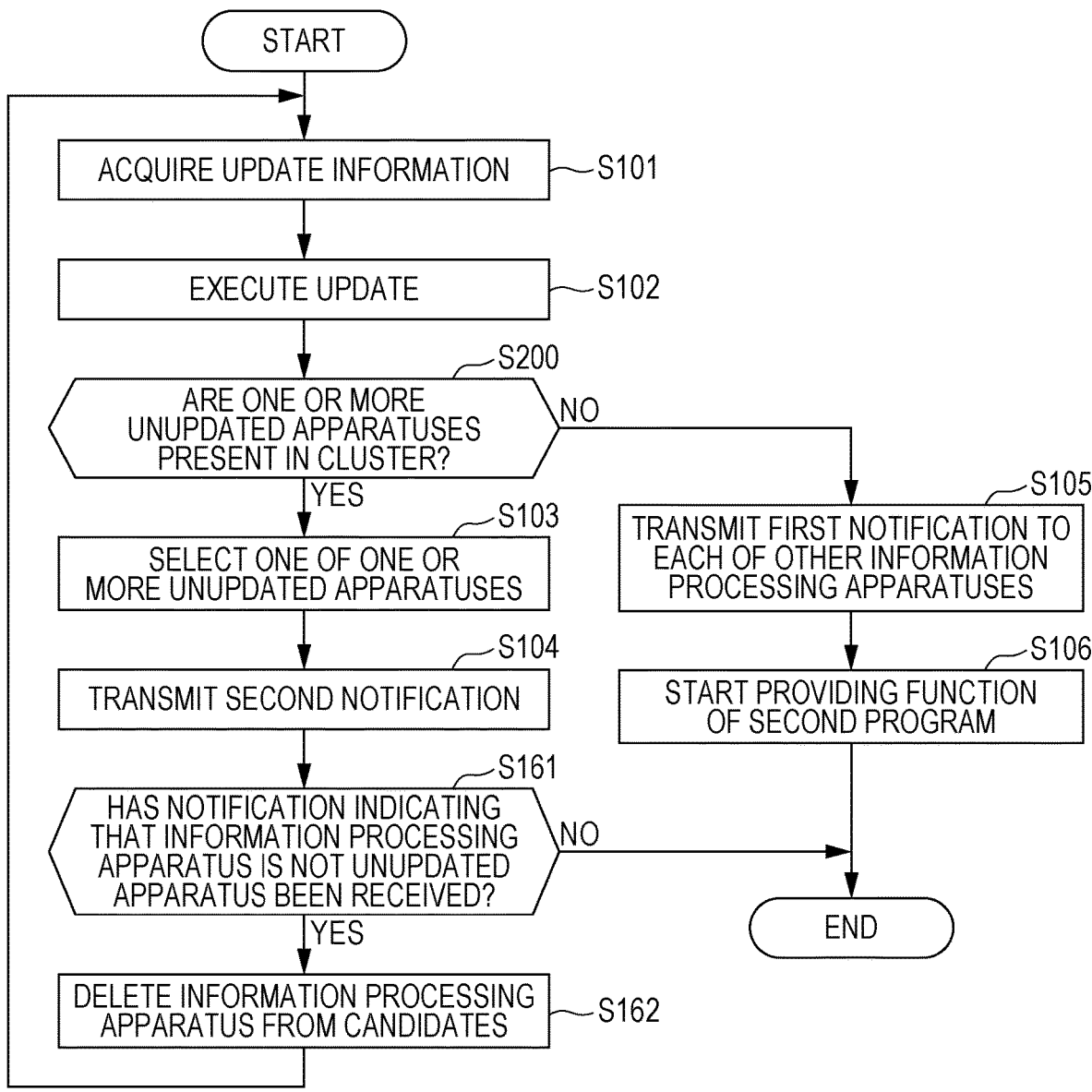
FIG. 24 is a flowchart illustrating an example of a flow of an operation of modifying candidate unupdated apparatuses in accordance with a response according to the third modification example of the first exemplary embodiment.

FIG. 24 is a flowchart illustrating an example of a flow of an operation of modifying candidate unupdated apparatuses in accordance with a response. The operation illustrated in FIG. 24 includes all the steps illustrated in FIG. 8. The processor 11 of the information processing apparatus 1 determines, after step S104, whether or not a notification indicating not being an unupdated apparatus has been received from the information processing apparatus 1 to which the second notification has been transmitted (step S161).

If it is determined that a notification indicating not being an unupdated apparatus has not been received from the information processing apparatus 1 to which the second notification has been transmitted (NO in step S161), the processor 11 ends the process. On the other hand, if it is determined that a notification indicating not being an unupdated apparatus has been received from the information processing apparatus 1 to which the second notification has been transmitted (YES in step S161), the processor 11 deletes the information processing apparatus 1 as the responder from the candidate unupdated apparatuses (step S162). In this case, for example, the processor 11 may store in the memory 12 the apparatus ID of the information processing apparatus 1 that has transmitted the notification indicating not being an unupdated apparatus, and may delete the apparatus ID from the above-described unupdated apparatus list when the unupdated apparatus list is generated.

With this configuration, even if a wrong information processing apparatus 1 is specified as an unupdated apparatus in accordance with the content of a second notification under an environment in which the update is executed in parallel, the specification is modified based on a response from the information processing apparatus 1 to which the second notification has been transmitted.

Fourth Modification Example of First Exemplary Embodiment

In the above-described first exemplary embodiment, the processor 11 of the information processing apparatus 1 deletes, from the unupdated apparatus list, the identification information of the information processing apparatus 1 indicated in a received second notification, and determines whether or not one or more unupdated apparatuses are present in accordance with whether or not one or more apparatus IDs are included in the unupdated apparatus list, but the determination method is not limited thereto. For example, the processor 11 may determine whether or not one or more unupdated apparatuses are present in the cluster C on the basis of the number of apparatus IDs included in a received second notification. In this case, the processor 11 may store in advance the number of information processing apparatuses 1 constituting the cluster C in the memory 12, and may determine whether or not one or more unupdated apparatuses are present in the cluster C by using the stored number and the number of apparatus IDs indicated in the second notification.

That is, the processor 11 is an example of a processor configured to determine, in a case where a second notification is received from one of the one or more other information processing apparatuses, whether or not one or more unupdated apparatuses are present on the basis of the number of pieces of identification information included in the received second notification.

Fifth Modification Example of First Exemplary Embodiment

In the above-described first exemplary embodiment, the processor 11 of the information processing apparatus 1 generates a new second notification by adding the identification information of the own information processing apparatus 1, but the second notification may not include the identification information of the own apparatus. For example, the second notification may include, instead of the identification information of the information processing apparatuses 1 that have completed the update, the number of information processing apparatuses 1 that have completed the update in the cluster C.

The processor 11 generates a second notification indicating "1" in a case where a second notification has not been received from any of the other information processing apparatuses 1 and the own information processing apparatus 1 has completed the update, and transmits the generated second notification to one of unupdated apparatuses. On other hand, in a case where a second notification has been received from one of the other information processing apparatuses 1 and it is determined that one or more unupdated apparatuses are present in the cluster C, the processor 11 generates a second notification indicating a number calculated by adding 1 to the number indicated in the received second notification, and transmits the generated second notification to one of unupdated apparatuses. For example, if the number indicated in the received second notification is "3", the processor 11 increments it by one and newly generates a second notification indicating "4".

In this case, the processor 11 may store in advance the number of information processing apparatuses 1 constituting the cluster C in the memory 12, and may compare the number with the number indicated in a received second notification, thereby determining whether or not one or more unupdated apparatuses are present. That is, the processor 11 is an example of a processor configured to transmit, in a case where a second notification is not received from any of the one or more other information processing apparatuses and the information processing apparatus has completed the update, the second notification indicating 1 that is the number of information processing apparatuses that have completed the update, and transmit, in a case where a second notification is received from one of the one or more other information processing apparatuses and a determination is made that the one or more unupdated apparatuses are present, the second notification indicating a number calculated by adding 1 to a number indicated in the received second notification.

Second Exemplary Embodiment

In a second exemplary embodiment, the plural information processing apparatuses 1 included in the information processing system 9 are different from those in the first exemplary embodiment in the operation involved in completion of update.

Operation Involved in Completion of Update in Second Exemplary Embodiment

Figure 25:
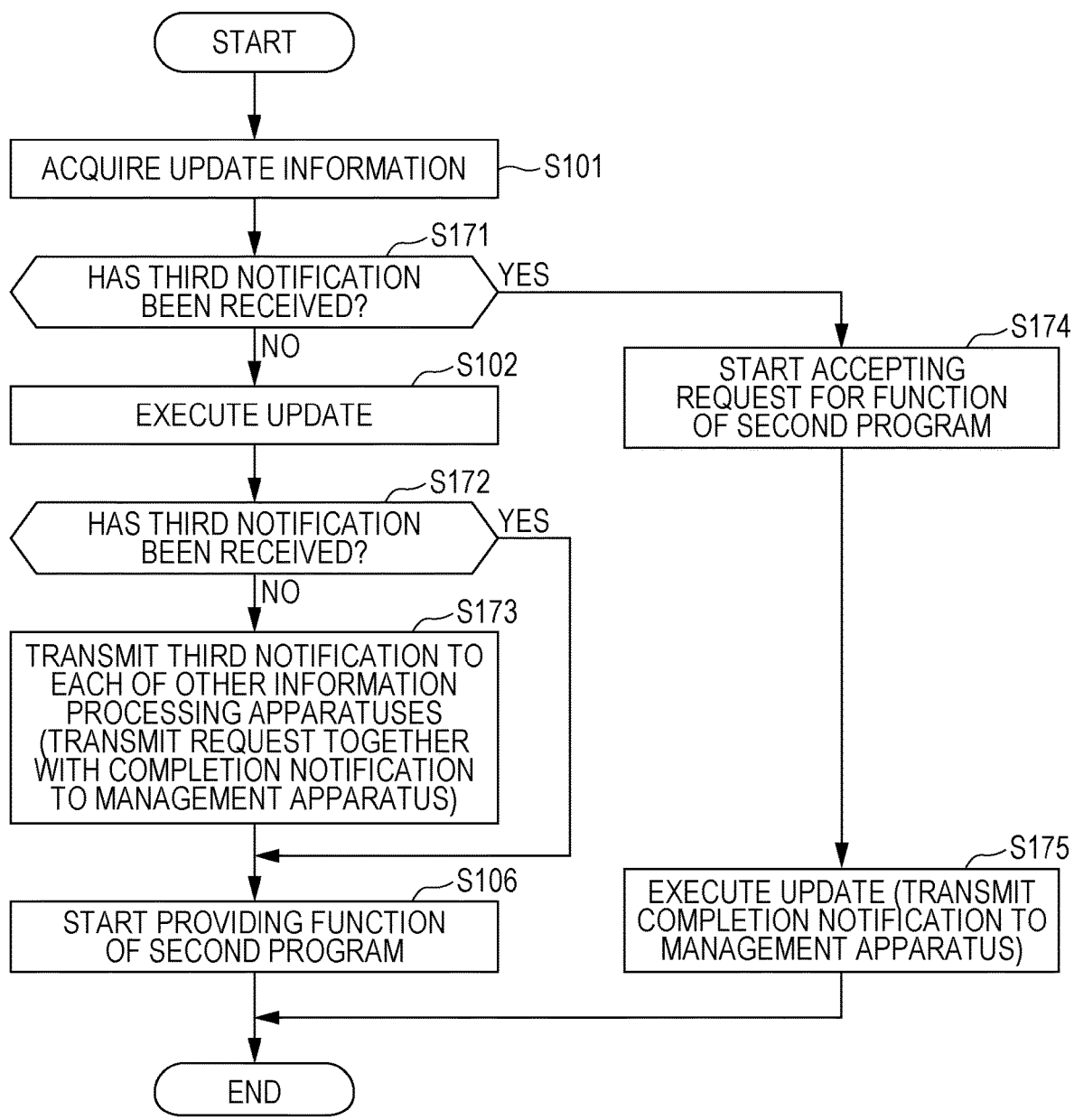
FIG. 25 is a flowchart illustrating an example of a flow of an operation involved in completion of update according to a second exemplary embodiment.

FIG. 25 is a flowchart illustrating an example of a flow of an operation involved in completion of the update in the second exemplary embodiment. The processor 11 of the information processing apparatus 1 acquires update information from the external apparatus that is not illustrated through the communication line 3 (step S101), and then determines whether or not a notification indicating that one of the plural information processing apparatuses 1 constituting the cluster C is the first apparatus to complete update (hereinafter referred to as a third notification) has been received from the one information processing apparatus 1 (step S171).

If it is determined that a third notification has not been received from any of the plural information processing apparatuses 1 (NO in step S171), the processor 11 executes the update by using the update information acquired in step S101 (step S102).

After completing the update, the processor 11 determines again whether or not a third notification has been received from one of the plural information processing apparatuses 1 (step S172). This is because the update takes time and thus the situation may be different between the time point of step S171 and the time point of step S172.

If it is determined in step S172 that a third notification has been received from one of the plural information processing apparatuses 1 (YES in step S172), the processor 11 transmits a third notification to each of the other information processing apparatuses 1 (step S173). That is, the processor 11 is an example of a processor configured to transmit, in a case where the information processing apparatus completes the update before all the one or more other information processing apparatuses complete the update, a third notification indicating that the information processing apparatus is the first apparatus to complete the update to each of the one or more other information processing apparatuses.

In a case where the information processing system 9 includes the management apparatus 4 like the above-described information processing system 9a, the processor 11 may transmit a completion notification to the management apparatus 4 and may request the transmission of a third notification to the management apparatus 4 in step S173.

Subsequently, the processor 11 starts providing the function of the second program (step S106) and ends the process. That is, the processor 11 is an example of a processor configured to provide the function of the second program after transmitting the third notification.

On the other hand, if it is determined in step S171 that a third notification has been received from one of the plural information processing apparatuses 1 (YES in step S171), the processor 11 starts accepting a request for the function of the second program (step S174), executes the update by using the update information acquired in step S101 (step S175), and ends the process.

That is, the processor 11 is an example of a processor configured to accept a request for the function of the second program from a user in a case where a third notification has been received from one of the one or more other information processing apparatuses.

The case where a third notification has been received from one of the plural information processing apparatuses 1 is a case where another information processing apparatus 1 among the plural information processing apparatuses 1 constituting the cluster has completed the update. The case where the own information processing apparatus 1 has transmitted a third notification is a case where the update has been completed in the own information processing apparatus 1 among the plural information processing apparatuses 1 constituting the cluster.

In these two cases, the information processing apparatus 1 starts providing the function of the second program. Thus, the processor 11 is an example of a processor configured to accept a request for the function of the second program in a case where at least one of the plural information processing apparatuses constituting the cluster has completed the update.

Each of the processors 11 of the plural information processing apparatuses 1 constituting the cluster C starts providing the function of the second program in the above-described two cases. That is, each of these processors 11 is an example of a processor configured to accept a request for the function of the second program from a terminal in a case where at least one of the plural information processing apparatuses constituting the cluster has completed the update.

In a case where the information processing system 9 includes the management apparatus 4 like the above-described information processing system 9a, the processor 11 may transmit a completion notification to the management apparatus 4 in the above-described step S175 after completing the update.

With this configuration, in response to receipt of a third notification by each of the plural information processing apparatuses 1 constituting the cluster C, acceptance of a request for the function of the second program is started simultaneously, and thus users who use the cluster C are provided with the same function at least at the same timing regardless of the information processing apparatuses 1 constituting the cluster C assigned thereto.

Operation of Transferring Request in Second Exemplary Embodiment

The information processing apparatus 1 accepts a request for the function of the second program after receiving a third notification even if the update has not been completed in the information processing apparatus 1. However, if the information processing apparatus 1 accepts the request from a user before the update has not been completed, the information processing apparatus 1 is incapable of responding to the request at least at the time point. Thus, the information processing system 9 according to the second exemplary embodiment transfers the request as one method for addressing such a case.

Figure 26:
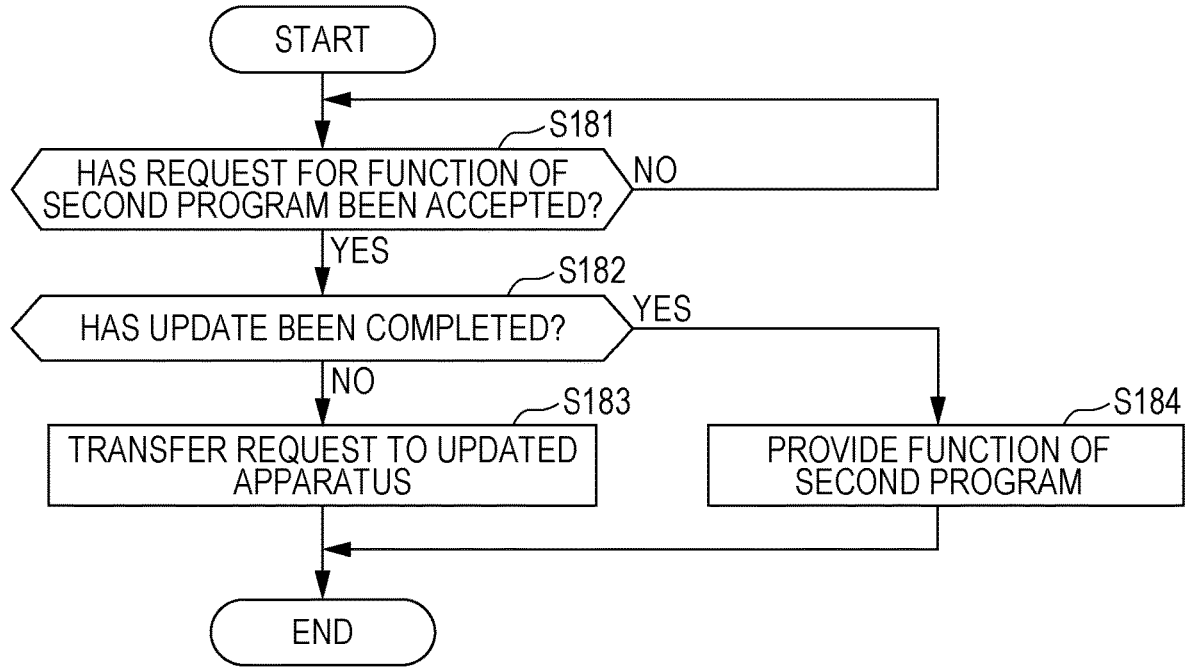
FIG. 26 is a flowchart illustrating an example of a flow of an operation transferring a request according to the second exemplary embodiment.

FIG. 26 is a flowchart illustrating an example of a flow of an operation of transferring a request. The processor 11 of the information processing apparatus 1 determines whether or not a request for the function of the second program has been accepted (step S181), and continues the determination as long as it is determined that a request has not been accepted (NO in step S181). The acceptance of the request includes a case where the request is transferred from another information processing apparatus 1.

On the other hand, if it is determined that a request for the function of the second program has been accepted (YES in step S181), the processor 11 determines whether or not the update has been completed in the own information processing apparatus 1 (step S182).

If it is determine that the update has not been completed in the own information processing apparatus 1 (NO in step S182), the processor 11 transfers the accepted request to an information processing apparatus 1 that has completed the update (hereinafter referred to as an updated apparatus) among the other information processing apparatuses 1 constituting the cluster C (step S183). That is, the processor 11 is an example of a processor configured to transfer, in a case where the request for the function of the second program is accepted from a user before the information processing apparatus completes the update, the request to an apparatus that has completed the update among the one or more other information processing apparatuses.

On the other hand, if it is determined that the update has been completed in the own information processing apparatus 1 (YES in step S182), the processor 11 provides the function of the second program in the own information processing apparatus 1 (step S184).

In a case where the above-described request is a request accepted as a result of being transferred from another information processing apparatus 1, the information processing apparatus 1 is an updated apparatus and thus the determination in the above-described step S182 is "YES", and the processor 11 provides the function of the second program. That is, the processor 11 is an example of a processor configured to provide the function indicated in the request in a case where the request is transferred from one of the one or more other information processing apparatuses. With this operation, when an updated function is requested from a user before the entire cluster C completes the update of the program, a situation does not occur in which the function is not provided.

MODIFICATION EXAMPLES OF SECOND EXEMPLARY EMBODIMENT

The second exemplary embodiment described above may be modified in the following manner. The following modification examples may be combined with each other, or may be combined with the above-described first exemplary embodiment and the modification examples thereof.

First Modification Example of Second Exemplary Embodiment

In the above-described second exemplary embodiment, to address the inconvenience of not being capable of responding to a request accepted from a user when the update has not been completed, the information processing apparatus 1 transfers the request to an updated apparatus, but the method for addressing the inconvenience is not limited thereto. For example, the information processing apparatus 1 may provide the requested function of the second program after the update has been completed in the information processing apparatus 1.

Operation of Suspending Provision of Function in First Modification Example

Figure 27:
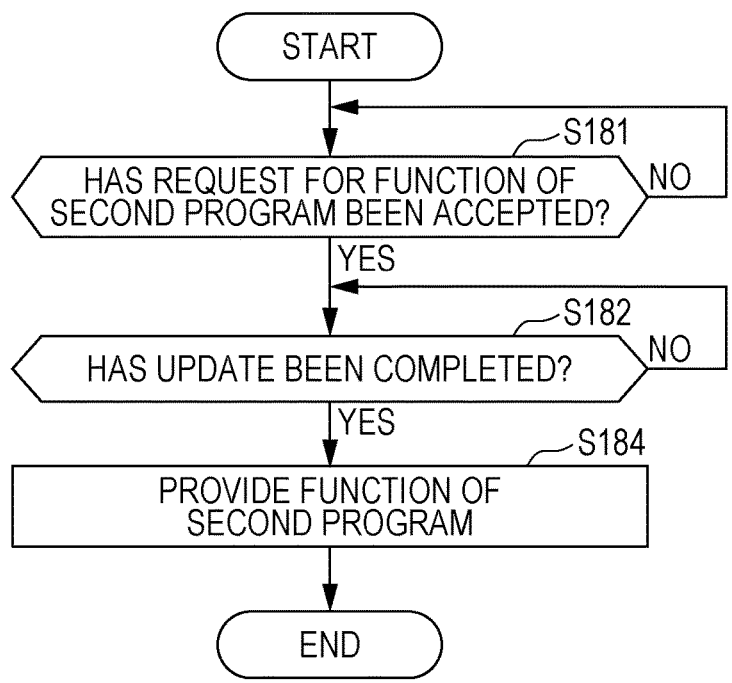
FIG. 27 is a flowchart illustrating an example of a flow of an operation of suspending provision of a function according to a first modification example of the second exemplary embodiment.

FIG. 27 is a flowchart illustrating an example of a flow of an operation of suspending provision of a function. The operation illustrated in FIG. 27 includes the steps illustrated in FIG. 26 except for step S183. The operation illustrated in FIG. 27 is different from the operation illustrated in FIG. 26 in that, if it is determined in step S182 that the own information processing apparatus has not completed the update (NO in step S182), the processor 11 continues the determination in step S182.

With this operation, the information processing apparatus 1 does not transfer the accepted request, and provision of the function in response to the request is suspended until the update has been completed. That is, the processor 11 is an example of a processor configured to provide, in a case where the request for the function of the second program is accepted from a user before the information processing apparatus completes the update, the function indicated in the request after completing the update.

Thus, the user who requests the function of the second program is caused to wait until the update has been completed, but the function received by the user from the cluster C does not vary.

Second Modification Example of Second Exemplary Embodiment

In the above-described second exemplary embodiment, the cluster C does not include a management apparatus that manages the information processing apparatuses 1, but the cluster may include a management apparatus. In this case, the plural information processing apparatuses 1 constituting the cluster may request the management apparatus to transmit a third notification without transmitting the third notification directly to the other information processing apparatuses 1. The information processing system according to the second modification example has the configuration of the information processing system 9*a* illustrated in FIG. 14 described above. The processor 11 of each of the information processing apparatuses 1*a* included in the information processing system 9*a* transmits to the management apparatus 4 a completion notification indicating that the own information processing apparatus 1*a* has completed the update and also requests the management apparatus 4 to transmit the third notification in step S173 illustrated in FIG. 25.

In addition, the processor 11 transmits the above-described completion notification to the management apparatus 4 after step S175 illustrated in FIG. 25. In this case, the information processing apparatus 1*a* is not the first apparatus to complete the update in the cluster Ca because the information processing apparatus 1*a* receives a third notification from another information processing apparatus 1*a* in step S171 illustrated in FIG. 25. Thus, in this case, the processor 11 transmits a completion notification to the management apparatus 4 but does not request transmission of the third notification.

Operation of Management Apparatus in Second Modification Example

Figure 28:
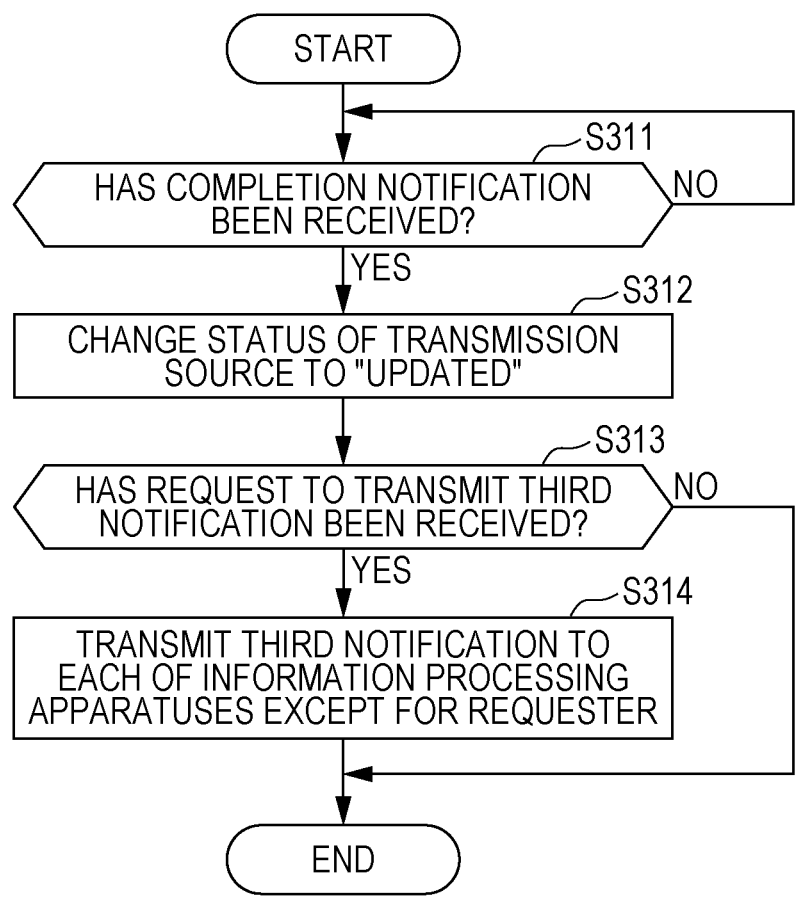
FIG. 28 is a flowchart illustrating an example of a flow of an operation of the management apparatus according to a second modification example of the second exemplary embodiment.

FIG. 28 is a flowchart illustrating an example of a flow of the operation of the management apparatus 4 according to the second modification example. The processor 41 of the management apparatus 4 determines whether or not a completion notification has been received from one of the plural information processing apparatuses 1*a* (step S311), and continues the determination as long as it is determined that a completion notification has not been received (NO in step S311).

On the other hand, if it is determined that the above-described completion notification has been received (YES in step S311), the processor 41 reads out the cluster configuration DB 423 illustrated in FIG. 17 from the memory 42 and changes, in the apparatus list 4232, the field of "status" corresponding to the apparatus ID of the information processing apparatus 1*a* as the transmission source of the completion notification to "updated" (step S312).

Subsequently, the processor 41 determines whether or not a request to transmit a third notification has been received together with the completion notification (step S313).

If it is determined that a request to transmit a third notification has been received (YES in step S313), the processor 41 transmits a third notification to each of the information processing apparatuses 1*a* except for the information processing apparatus 1*a* as the requester (step S314).

On the other hand, if it is determined that a request to transmit a third notification has not been received (NO in step S313), the processor 41 ends the process.

Also with this configuration, in response to receipt of a third notification transmitted by the management apparatus 4, the plural information processing apparatuses 1*a* simultaneously start accepting a request for the function of the second program. Thus, users who use the cluster Ca are provided with the same function at least at the same timing regardless of the information processing apparatuses 1a assigned thereto.

Third Exemplary Embodiment

Figure 29:
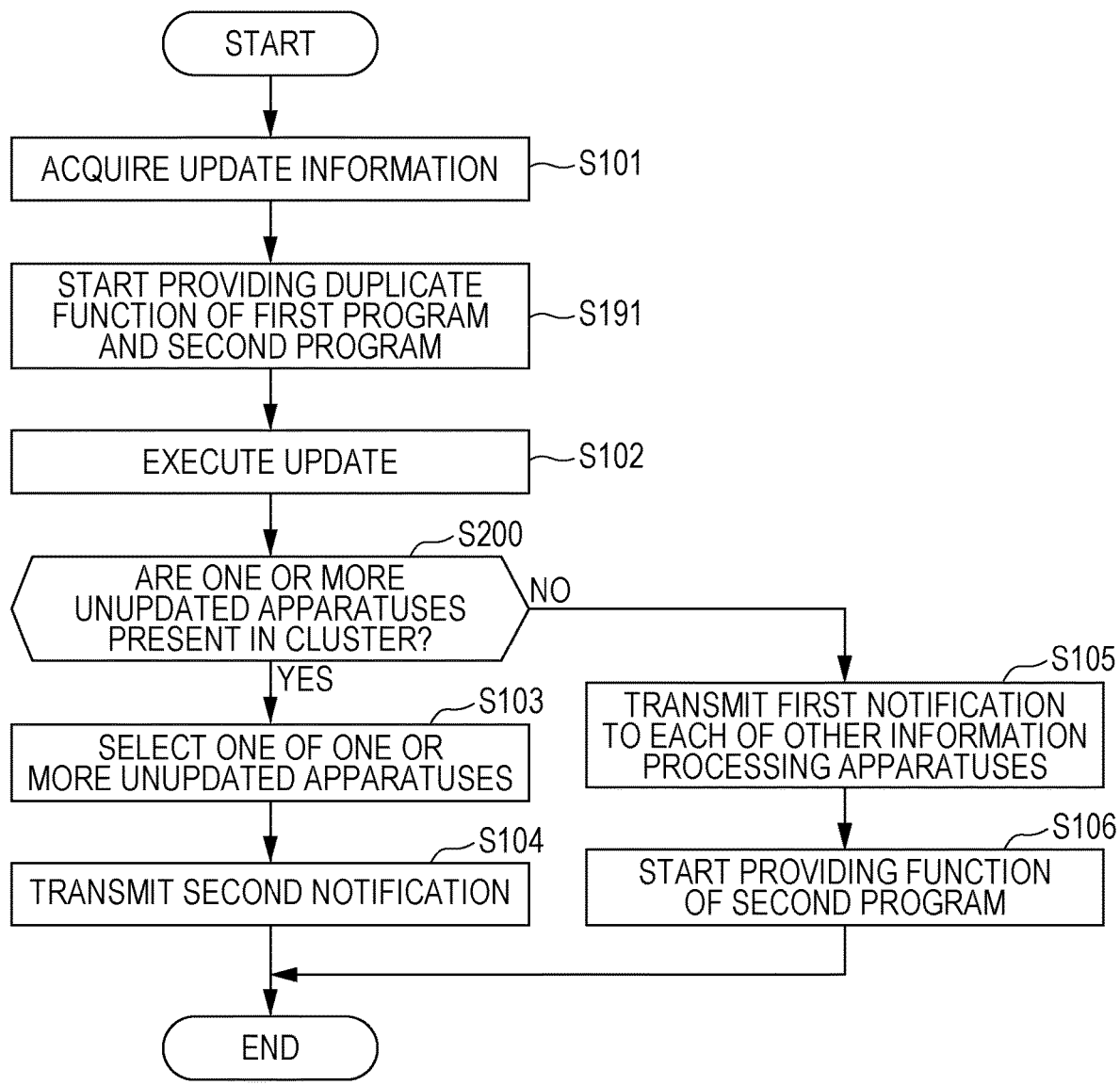
FIG. 29 is a flowchart illustrating an example of a flow of an update operation according to a third exemplary embodiment.

In a third exemplary embodiment, the plural information processing apparatuses 1 included in the information processing apparatus 9 perform an update operation different from that in the first and second exemplary embodiments.
Update Operation in Third Exemplary Embodiment FIG. 29 is a flowchart illustrating an example of a flow of an update operation according to the third exemplary embodiment. The operation illustrated in FIG. 29 includes all the steps illustrated in FIG. 8. In the third exemplary embodiment, the processor 11 of the information processing apparatus 1 acquires update information (step S101), and then starts providing a duplicate function of the first program and the second program (hereinafter referred to as a duplicate function) (step S191) before executing update by using the update information (step S102). Starting providing a duplicate function is starting acceptance of a request by limiting the function to be provided to the duplicate function. That is, the processor 11 is an example of a processor configured to accept a request for a duplicate function of the first program and the second program in a case where at least one of the plural information processing apparatuses constituting the cluster has not completed the update of the first program.

The processors 11 of the plural information processing apparatuses 1 constituting the cluster C start providing the above-described duplicate function after acquiring the update information and before executing the update by using the update information. That is, each of these processors 11 is an example of a processor configured to accept a request for a duplicate function of the first program and the second program from a terminal in a case where at least one of the plural information processing apparatuses constituting the cluster has not completed the update.

With this configuration, the plural information processing apparatuses 1 constituting the cluster C in the third exemplary embodiment simultaneously acquire update information from the external apparatus, thereby starting providing the above-described duplicate function at the same timing.

Figure 30:
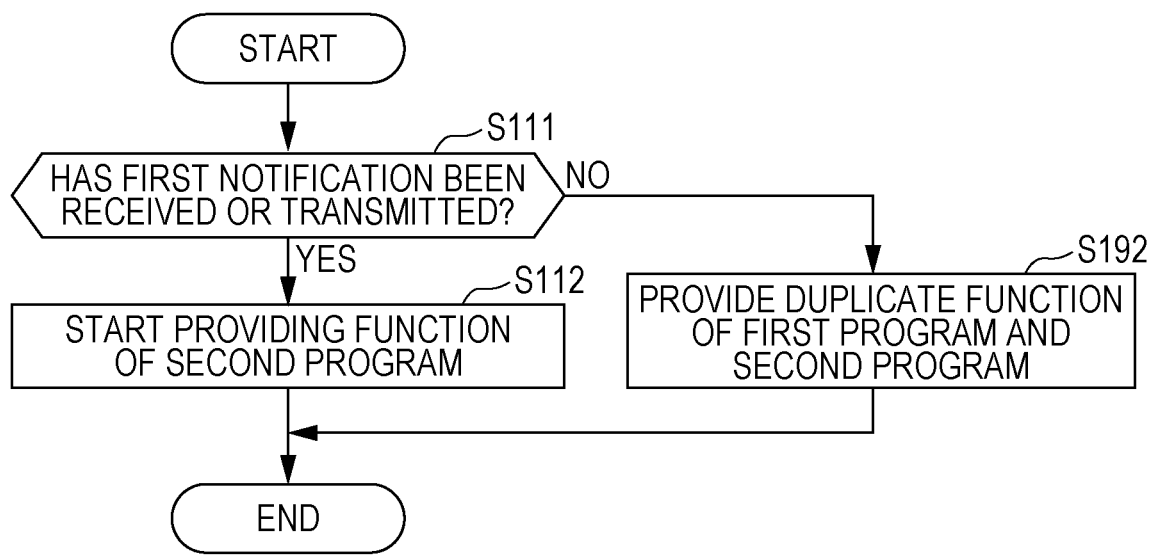
FIG. 30 is a flowchart illustrating an example of a flow of an operation of switching a function according to the third exemplary embodiment.

Alternatively, the processor 11 may start providing the above-described duplicate function when, for example, a predetermined date and time included in the update information has come after acquiring the update information. Accordingly, even if the timing to acquire the update information varies among the plural information processing apparatuses 1, the information processing apparatuses 1 start providing the above-described duplicate function at the same timing.
Operation of Switching Function to be Provided in Third Exemplary Embodiment FIG. 30 is a flowchart illustrating an example of a flow of an operation of switching a function in the third exemplary embodiment. The operation illustrated in FIG. 30 includes step S192 instead of step S113 illustrated in FIG. 12, and the other steps are the same as in FIG. 12. If it is determined that a first notification has not been received or transmitted (NO in step S111), the processor 11 of the information processing apparatus 1 continues providing the above-described duplicate function (step S192).

That is, in the third exemplary embodiment, each of the plural information processing apparatuses 1 constituting the cluster C provides the duplicate function of the first program and the second program over a period in which the information processing apparatus 1 has not received a first notification from another information processing apparatus 1 and has not transmitted a first notification. Each of these plural information processing apparatuses 1 starts providing the function of the second program after receiving a first notification from another information processing apparatus 1 or transmitting a first notification.

With this configuration, the plural information processing apparatuses 1 constituting the cluster C end providing the above-described duplicate function and start providing the function of the second program at the same timing when the update has been completed in all the apparatuses. That is, the processor 11 of the information processing apparatus 1 is an example of a processor configured to provide the function of the second program to a user in a case where all the plural information processing apparatuses constituting the cluster have completed the update of the first program.

In addition, the processor 11 is an example of a processor configured to provide the function of the second program to a user of a terminal in a case where all the plural information processing apparatuses constituting the cluster have completed the update. Thus, also in the third exemplary embodiment, the function that is available only after the update is not requested from a user before the update of the program is completed in the entire cluster C, and thus confusion resulting from being unable to provide the function does not occur.

In the information processing system 9 according to the third exemplary embodiment, a duplicate function is provided over a period from the start of update in each of the plural information processing apparatuses 1 to the completion of update in the entire cluster C. The duplicate function is a function included in both the first program and the second program, and is thus a function that can be provided before start of the update, during the update, and after completion of the update. Thus, in the third exemplary embodiment, each information processing apparatus 1 is capable of providing a function requested during the update and does not need to transfer the request to another information processing apparatus 1.

COMMON MODIFICATION EXAMPLES

The first exemplary embodiment, the second exemplary embodiment, and the third exemplary embodiment may be modified in the following manner. The following modification examples may be combined with each other or may be combined with any of the above-described exemplary embodiments and the modification examples thereof.

First Common Modification Example

In the above-described exemplary embodiments, the information processing apparatus 1, the information processing apparatus 1a, and the information processing apparatus 1b include the processor 11 constituted by a CPU. Alternatively, the controller that controls the information processing apparatus 1 and the like may be another configuration. For example, the information processing apparatus 1 may include various processors or the like in addition to the CPU.

Here, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

Second Common Modification Example

In each of the exemplary embodiments above, the term "processor" is broad enough to encompass one processor or plural processors in collaboration which are located physically apart from each other but may work cooperatively.

The order of operations of the processor is not limited to the one described in the exemplary embodiments above, and may be changed as appropriate.

Third Common Modification Example

In the above-described exemplary embodiments, the processor 11 of the information processing apparatus 1 may include update information in a second notification or a third notification. In this case, the update information may be supplied from the external apparatus to at least one of the information processing apparatuses 1 constituting the cluster C. The information processing apparatus 1 supplied with the update information from the external apparatus transmits a second notification or a third notification to another information processing apparatus 1 when update is completed in the information processing apparatus 1. The information processing apparatus 1 that has received the second notification or the third notification may extract the update information included therein to acquire the update information.

Fourth Common Modification Example

In the above-described first exemplary embodiment, the program executed by the processor 11 of the information processing apparatus 1 is an example of a program that causes a computer to execute a process, the computer including a processor that executes a first program. The process includes acquiring update information for executing update from the first program to a second program, executing the update by using the update information, accepting a request for a function of the first program in a case where at least one of plural information processing apparatuses constituting a cluster has not completed the update, and providing a function of the second program to a user in a case where all the plural information processing apparatuses have completed the update.

In the above-described second exemplary embodiment, the program executed by the processor 11 of the information processing apparatus 1 is an example of a program that causes a computer to execute a process, the computer including a processor that executes a first program. The process includes acquiring update information for executing update from the first program to a second program, executing the update by using the update information, and accepting a request for a function of the second program in a case where at least one of plural information processing apparatuses constituting a cluster has completed the update.

In the above-described third exemplary embodiment, the program executed by the processor 11 of the information processing apparatus 1 is an example of a program that causes a computer to execute a process, the computer including a processor that executes a first program. The process includes acquiring update information for executing update from the first program to a second program, executing the update by using the update information, accepting a request for a duplicate function of the first program and the second program in a case where at least one of plural information processing apparatuses constituting a cluster has not completed the update, and providing a function of the second program to a user in a case where all the plural information processing apparatuses have completed the update.

These programs may be provided in the state of being stored in a computer-readable recording medium, for example, a magnetic recording medium such as magnetic tape or a magnetic disk, an optical recording medium such as an optical disc, a magneto-optical recording medium, or a semiconductor memory. The programs may be downloaded through a communication line, such as the Internet.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor that executes a first program, the processor being configured to:
   acquire update information for executing update from the first program to a second program,
   execute the update by using the update information,
   determine whether there is at least one of a plurality of information processing apparatuses constituting a cluster that has completed the update, the plurality of information processing apparatuses constituting the cluster including the information processing apparatus and one or more other information processing apparatuses,
   upon a determination that at least one of the other information processing apparatuses in the cluster has completed the update and the information processing apparatus has not completed the update:
      receive a request transferred from the at least one of the other information processing apparatuses that has completed the update to the information processing apparatus that has not completed the update, wherein the request is a request from a user to use a function of the first program and is not a request for updating the first program to the second program, and
      provide the function of the first program indicated in the request, in lieu of the at least one of the other information processing apparatuses.

2. The information processing apparatus according to claim 1, wherein the processor is configured to:
   when the information processing apparatus completes the update after all the one or more other information processing apparatuses have completed the update, transmit a first notification indicating that the information processing apparatus is the last apparatus to complete the update to each of the one or more other information processing apparatuses,
   provide the function of the second program after transmitting the first notification, and provide the function of the second program upon receiving a first notification indicating that one of the one or more other information processing apparatuses is the last apparatus to complete the update from the one of the one or more other information processing apparatuses.

3. The information processing apparatus according to claim 2, wherein the processor is configured to:
upon a determination that one or more un-updated apparatuses that have not completed the update are present among the one or more other information processing apparatuses when the information processing apparatus has completed the update, transmit a second notification indicating that the information processing apparatus has completed the update to at least one of the one or more un-updated apparatuses,
upon receiving a second notification indicating that one of the one or more other information processing apparatuses has completed the update from the one of the one or more other information processing apparatuses, determine whether or not any other un-updated apparatus is present among the one or more other information processing apparatuses, based on content of the received second notification,
upon a determination that another un-updated apparatus is present among the one or more other information processing apparatuses, transmit the second notification including the content of the received second notification and indicating that the information processing apparatus has completed the update, and
upon a determination that no other un-updated apparatus is present among the one or more other information processing apparatuses, transmit the first notification indicating that the information processing apparatus is the last apparatus to complete the update.

4. The information processing apparatus according to claim 3, wherein the processor is configured to:
transmit the second notification indicating that the information processing apparatus has completed the update, the second notification including identification information of the information processing apparatus, and
upon receiving the second notification indicating that one of the one or more other information processing apparatuses has completed the update from the one of the one or more other information processing apparatuses, determine whether or not any other un-updated apparatus is present among the one or more other information processing apparatuses, based on a number of pieces of identification information included in the received second notification.

5. The information processing apparatus according to claim 3, wherein the processor is configured to:
when the second notification indicating that one of the one or more other information processing apparatuses has completed the update is not received from any of the one or more other information processing apparatuses and the information processing apparatus has completed the update, transmit the second notification indicating 1 that is the number of information processing apparatuses that have completed the update, and
when the second notification indicating that one of the one or more other information processing apparatuses has completed the update is received from the one of the one or more other information processing apparatuses and a determination is made that any other un-updated apparatus is present among the one or more other information processing apparatuses, transmit the second notification indicating a number calculated by adding 1 to a number indicated in the received second notification.

6. The information processing apparatus according to claim 2, wherein the processor is configured to
determine, based on route information indicating a predetermined route included in the update information, whether or not the information processing apparatus is the last apparatus to complete the update.

7. The information processing apparatus according to claim 1, wherein the processor is configured to:
when the request for the function of the first program is accepted from the user after the information processing apparatus has completed the update, transfer the request to an apparatus that has not completed the update among the one or more other information processing apparatuses, and
provide the function indicated in the request when the request is transferred from one of the one or more other information processing apparatuses.

8. The information processing apparatus according to claim 2, wherein the processor is configured to:
when the request for the function of the first program is accepted from the user after the information processing apparatus has completed the update, transfer the request to an apparatus that has not completed the update among the one or more other information processing apparatuses, and
provide the function indicated in the request when the request is transferred from one of the one or more other information processing apparatuses.

9. The information processing apparatus according to claim 3, wherein the processor is configured to:
when the request for the function of the first program is accepted from the user after the information processing apparatus has completed the update, transfer the request to an apparatus that has not completed the update among the one or more other information processing apparatuses, and
provide the function indicated in the request when the request is transferred from one of the one or more other information processing apparatuses.

10. The information processing apparatus according to claim 4, wherein the processor is configured to:
when the request for the function of the first program is accepted from the user after the information processing apparatus has completed the update, transfer the request to an apparatus that has not completed the update among the one or more other information processing apparatuses, and
provide the function indicated in the request when the request is transferred from one of the one or more other information processing apparatuses.

11. The information processing apparatus according to claim 5, wherein the processor is configured to:
when the request for the function of the first program is accepted from the user after the information processing apparatus has completed the update, transfer the request to an apparatus that has not completed the update among the one or more other information processing apparatuses, and
provide the function indicated in the request when the request is transferred from one of the one or more other information processing apparatuses.

12. The information processing apparatus according to claim 6, wherein the processor is configured to:

when the request for the function of the first program is accepted from the user after the information processing apparatus has completed the update, transfer the request to an apparatus that has not completed the update among the one or more other information processing apparatuses, and provide the function indicated in the request when the request is transferred from one of the one or more other information processing apparatuses.

13. An information processing apparatus comprising
a processor that executes a first program, the processor being configured to:
acquire update information for executing update from the first program to a second program,
execute the update by using the update information,
determine whether there is at least one of a plurality of information processing apparatuses constituting a cluster that has not completed the update, the plurality of information processing apparatuses constituting the cluster including the information processing apparatus and one or more other information processing apparatuses, and
upon a determination that at least one of the other information processing apparatuses has not completed the update and the information processing apparatus has completed the update:
receive a request transferred from the at least one of the other information processing apparatuses that has not completed the update to the information processing apparatus that has completed the update, wherein the request is a request from a user to use a function of the second program and is not a request for updating the first program to the second program, and
provide the function of the second program indicated in the request, in lieu of the at least one of the other information processing apparatuses.

14. The information processing apparatus according to claim 13, wherein the processor is configured to:
when the information processing apparatus completes the update before all the one or more other information processing apparatuses complete the update, transmit a notification indicating that the information processing apparatus is the first apparatus to complete the update to each of the one or more other information processing apparatuses,
provide the function of the second program after transmitting the notification, and
accept the request for the function of the second program from a user upon receiving a notification indicating that one of the one or more other information processing apparatuses is the first apparatus to complete the update from the one of the one or more other information processing apparatuses.

15. The information processing apparatus according to claim 13, wherein the processor is configured to:
when the request for the function of the second program is accepted from a user before the information processing apparatus completes the update, transfer the request to an apparatus that has completed the update among the one or more other information processing apparatuses, and
provide the function indicated in the request upon receiving the request that is transferred from one of the one or more other information processing apparatuses.

16. The information processing apparatus according to claim 14, wherein the processor is configured to:

when the request for the function of the second program is accepted from the user before the information processing apparatus completes the update, transfer the request to an apparatus that has completed the update among the one or more other information processing apparatuses, and
provide the function indicated in the request upon receiving the request that is transferred from one of the one or more other information processing apparatuses.

17. The information processing apparatus according to claim 13, wherein the processor is configured to
when the request for the function of the second program is accepted from a user before the information processing apparatus completes the update, transfer the function indicated in the request after completing the update.

18. The information processing apparatus according to claim 14, wherein the processor is configured to
when the request for the function of the second program is accepted from the user before the information processing apparatus completes the update, transfer the function indicated in the request after completing the update.

19. An information processing system comprising:
a terminal; and
a plurality of information processing apparatuses constituting a cluster,
the plurality of information processing apparatuses each including a processor that executes a first program, each respective processor of the plurality of information processing apparatuses being configured to:
acquire update information for executing update from the first program to a second program,
execute the update by using the update information,
after completing the update, upon a determination that at least one of the plurality of information processing apparatuses has not completed the update, accept a request transferred from the at least one of the plurality of information processing apparatuses that has not completed the update, wherein the request is a request from a user of the terminal to use a function of the second program and is not a request for updating the first program to the second program, and
provide the function of the second program to the user of the terminal in lieu of the at least one of the plurality of information processing apparatuses that has not completed the update.

20. A non-transitory computer readable medium storing a program causing a computer to execute a process for information processing, the computer including a processor that executes a first program, the process comprising:
acquiring update information for executing update from the first program to a second program;
executing the update by using the update information;
determining whether there is at least one of a plurality of information processing apparatuses constituting a cluster that has completed the update, the plurality of information processing apparatuses constituting the cluster including the computer and one or more other information processing apparatuses,
upon a determination that at least one of the other information processing apparatuses in the cluster has completed the update and the computer has not completed the update:
receiving a request transferred from the at least one of the other information processing apparatuses that has completed the update to the computer that has not completed the update, wherein the request is a request from a user to use a function of the first program and is not a request for updating the first program to the second program; and providing the function of the first program indicated in the request, in lieu of the at least one of the other information processing apparatuses.

\* \* \* \* \*